(12) United States Patent
Kishigami et al.

(10) Patent No.: US 9,239,378 B2
(45) Date of Patent: Jan. 19, 2016

(54) RADAR DEVICE

(75) Inventors: Takaaki Kishigami, Tokyo (JP); Yoichi Nakagawa, Tokyo (JP); Hirohito Mukai, Tokyo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 392 days.

(21) Appl. No.: 13/824,585

(22) PCT Filed: Sep. 29, 2011

(86) PCT No.: PCT/JP2011/005503
§ 371 (c)(1),
(2), (4) Date: Mar. 18, 2013

(87) PCT Pub. No.: WO2012/046419
PCT Pub. Date: Apr. 12, 2012

(65) Prior Publication Data
US 2013/0176166 A1 Jul. 11, 2013

(30) Foreign Application Priority Data
Oct. 7, 2010 (JP) ................................. 2010-227994

(51) Int. Cl.
*G01S 13/08* (2006.01)
*G01S 13/28* (2006.01)
(Continued)

(52) U.S. Cl.
CPC ............... *G01S 13/284* (2013.01); *G01S 7/023* (2013.01); *G01S 13/222* (2013.01); *G01S 13/288* (2013.01); *G01S 13/91* (2013.01)

(58) Field of Classification Search
CPC ..... G01S 13/284; G01S 13/522; G01S 13/28; G01S 13/222; G01S 13/288; G01S 13/91; H04J 13/10
USPC .......................... 342/134, 145, 175, 189, 195
See application file for complete search history.

(56) References Cited

U.S. PATENT DOCUMENTS 5,151,702 A * 9/1992 Urkowitz .............. G01S 13/522
342/116
5,440,311 A * 8/1995 Gallagher ............. G01S 13/522
342/132
(Continued)

FOREIGN PATENT DOCUMENTS

EP 1 457 789 A2 9/2004
EP 1 783 976 A1 5/2007
(Continued)

OTHER PUBLICATIONS

Extended European Search Report dated Jul. 1, 2014, for corresponding EP Application No. 11830353.6-1812 / 2626720, 7 pages.
(Continued)

*Primary Examiner* — John B Sotomayor
*Assistant Examiner* — Marcus Windrich
(74) *Attorney, Agent, or Firm* — Seed IP Law Group PLLC

(57) ABSTRACT

A radar device is provided, which includes a first sector radar and a second sector radar, each including a code generator that generates two code sequences, a multiplier that multiplies the two code sequences by a coefficient sequence, wherein the two coefficient sequences of the first and second sector radars, respectively, are orthogonal to each other, a transmission signal generator that modulates the orthogonalized two code sequences, and an RF transmitter that transmits the modulated signal including the two orthogonalized two code sequences. At least one of the two orthogonal coefficient sequences for the first and second sector radars, respectively, includes one or more negative coefficients. The two orthogonal coefficient sequences include coefficients, which are identical to each other, in a first transmission cycle, and include coefficients, which are different from each other, in a second transmission cycle different from the first transmission cycle.

15 Claims, 14 Drawing Sheets

(51) Int. Cl.
*G01S 7/02* (2006.01)
*G01S 13/22* (2006.01)
*G01S 13/91* (2006.01)

(56) References Cited

U.S. PATENT DOCUMENTS

| | | | | |
|---|---|---|---|---|
| 5,786,788 | A * | 7/1998 | Schober | G01S 13/288 342/159 |
| 5,862,182 | A * | 1/1999 | Awater | H04J 13/10 370/209 |
| 6,141,373 | A * | 10/2000 | Scott | H04B 1/70755 375/142 |
| 6,822,605 | B2 * | 11/2004 | Brosche | G01S 7/282 342/130 |
| 7,394,845 | B2 * | 7/2008 | Alon | H04J 13/00 341/81 |
| 8,423,598 | B2 * | 4/2013 | Rudershausen | G01S 13/284 342/189 |
| 8,436,766 | B1 * | 5/2013 | Nunn | G01S 7/2921 342/159 |
| 2004/0178952 | A1 | 9/2004 | Jenkins | |
| 2008/0112501 | A1 | 5/2008 | Diaz Fuente et al. | |
| 2011/0211653 | A1 | 9/2011 | Diaz Fuente et al. | |

FOREIGN PATENT DOCUMENTS

| | | |
|---|---|---|
| JP | 61-096482 A | 5/1986 |
| JP | 08-146126 A | 6/1996 |
| JP | 2008-501264 A | 1/2008 |

OTHER PUBLICATIONS

Budisin, S.Z., "New Complementary Pairs of Sequences," Electronic Letters 26(13):881-883, Jun. 21, 1990.
International Search Report, mailed Nov. 8, 2011, for International Application No. PCT/JP2011/005503, 2 pages.

* cited by examiner

FIG. 12

```
METHOD OF GENERATING COMPLEMENTARY CODES a AND b OF CODE LENGTH L=2^Z a=[1 1]; b=[1 -1];

for ii=1:Z-1    REPEAT LOOP OF "for ii=1:Z-1 % for ~ end" (Z-1) TIMES c=a;

d=b;

a=[c d];%   CONNECTION OF SUB CODES c AND d b=[c -d];%  CONNECTION OF SUB CODES c AND -d, IN WHICH -d IS OBTAINED
              BY MULTIPLYING EACH ELEMENT OF SUB CODES d BY -1
end
```

FIG. 13
(a) 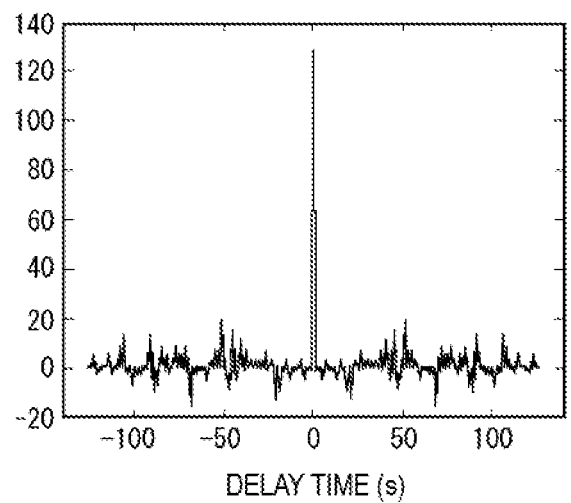
(b) 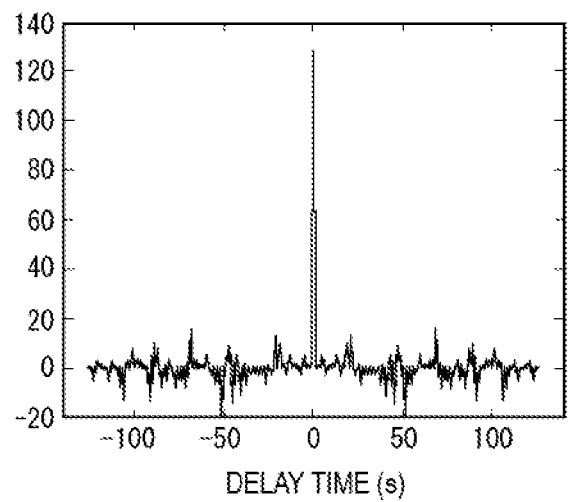
(c) 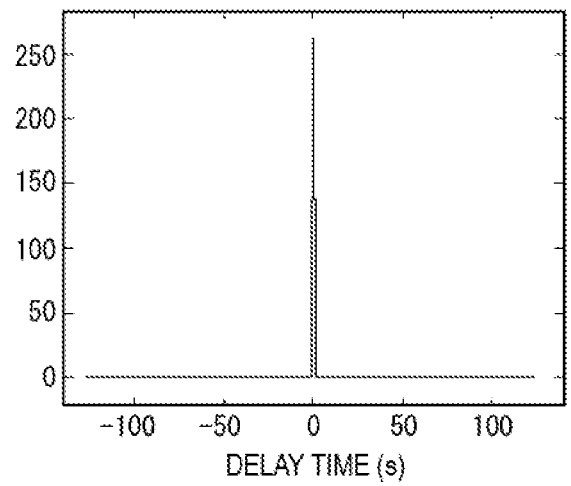

RADAR DEVICE

TECHNICAL FIELD

The present invention relates to a radar device that receives a signal of a reflected wave obtained as a high frequency transmission signal transmitted from each sector radar that measures each measurement area through a reception antenna to detect the target.

BACKGROUND ART

A radar device radiates a radio wave from a measurement point into a space and receives a signal of a reflected wave reflected from a target, to measure the distance, direction or the like from the measurement point to the target. Particularly, in recent years, a radar device has been developed that is capable of detecting a pedestrian or the like as well as an automobile as a target by performing high resolution measurement using a radio wave of a short wavelength such as a micro wave or a millimeter wave.

Further, the radar device receives a mixed signal of a reflected wave from a target in a short distance and a reflected wave from a target in a long distance. In particular, in a case where a range sidelobe occurs by the signal of the reflected wave from the target in a short distance, the range sidelobe and a main lobe of the signal of the reflected wave from the target in a long distance may be mixedly present. In this case, detection accuracy when the radar device detects the target in a long distance may be deteriorated.

Further, in a case where an automobile and a pedestrian are present in the same distance from the measurement point, the radar device may receive a mixed signal of signals of respective reflected waves from the automobile and the pedestrian having different radar cross sections (RCS). In general, it is said that the radar cross section of the pedestrian is lower than the radar cross section of the automobile. Thus, for example, even though the automobile and the pedestrian are present in the same distance from the measurement point, it is necessary for the radar device to appropriately receive the reflected wave from the pedestrian as well as the automobile.

Thus, in the radar device in which high resolution measurement is necessary with respect to a plurality of targets, it is necessary to perform transmission of a pulse wave or a pulse modulated wave having an auto-correlation characteristic of a low range sidelobe level (hereinafter, referred to as a "low range sidelobe characteristics"). Further, in the radar device, it is necessary to secure such a wide reception dynamic range as to receive signals of reflected waves of various reception levels according to the distance or type of the target.

With regard to the pulse wave or the pulse modulated wave having the above-mentioned low range sidelobe characteristics, a pulse compression radar that transmits a high frequency transmission signal using complementary codes has been proposed in the related art. Here, the pulse compression refers to a technique in which the radar pulse-modulates or phase-modulates a pulse signal and transmits the result using a signal of a wide pulse width, and demodulates (compresses) a received signal in signal processing after reception of a reflected wave and converts the result into a signal of a narrow pulse width, to thereby equivalently increase reception power. According to the pulse compression, it is possible to increase a detection distance of the target, and to enhance distance estimation accuracy for the detection distance.

The complementary codes is formed using a plurality of, for example, two complementary code sequences ($a_n$, $b_n$). Further, the complementary codes has a characteristic that, in respective auto-correlation calculation results of one complementary code sequence $a_n$ and the other complementary code sequence $b_n$, by causing delay times $\tau$ (second) to match with each other and adding the respective auto-correlation calculation results, the range sidelobe becomes zero. Here, a parameter n is 1, 2, . . . , L. A parameter L represents a code sequence length, or simply a code length.

A method of generating complementary codes is disclosed in NPL 1, for example. Here, a simple method of generating complementary codes will be described with reference to FIG. 12. FIG. 12 is a diagram illustrating an example of a general generation procedure of a code sequence of complementary codes. As shown in FIG. 12, sub code sequences (c, d) having a code length $L=2^{Z-1}$ formed using an element 1 or an element −1 are generated from disclosures in the fourth row and the fifth row, and code length complementary code sequences (a, b) having a code length $L=2^Z$ are generated from disclosures in the sixth row and the seventh row.

Here, one complementary code sequence a is obtained by connecting the sub code sequence c and the sub code sequence d. The other complementary code sequence b is obtained by connecting the sub code sequence c and a sub code sequence −d.

In FIG. 12, the code sequences a and b respectively represent complementary code sequences, and the code sequences c and d respectively represent sub code sequences that form the complementary code sequences. Further, a parameter Z defines a code length L of the respective generated complementary code sequences (a, b).

The characteristic of such complementary codes will be described with reference to FIG. 13. FIG. 13 is a diagram illustrating characteristics of complementary codes. (a) in FIG. 13 is a diagram illustrating an auto-correlation value calculation result of one complementary code sequence $a_n$. (b) in FIG. 13 is a diagram illustrating an auto-correlation value calculation result of the other complementary code sequence $b_n$. (c) in FIG. 13 is a diagram illustrating a value obtained by adding the auto-correlation value calculation results of two complementary code sequences ($a_n$, $b_n$). The code length L of the complementary codes used in FIG. 13 is 128.

The auto-correlation value calculation result of one complementary code sequence $a_n$ among the complementary code sequences ($a_n$, $b_n$) is calculated according to Formula (1). The auto-correlation value calculation result of the other complementary code sequence $b_n$ among the complementary code sequences ($a_n$, $b_n$) is calculated according to Formula (2). A parameter R represents an auto-correlation value calculation result. Here, in a case where n>L or n<1, the complementary code sequences $a_n$ and $b_n$ become zero (that is, in n>L or n<1, $a_n=0$ and $b_n=0$). Asterisk * represents a complex conjugate operator.

[Exp. 1]
$$R_{aa}(\tau) = \sum_{n=1}^{L} a_n a_{n+\tau}^* \tag{1}$$

[Exp. 2]
$$R_{bb}(\tau) = \sum_{n=1}^{L} b_n b_{n+\tau}^* \tag{2}$$

As shown in FIG. 13(a), in an auto-correlation value calculation result $R_{aa}(\tau)$ of the complementary code sequence $a_n$ calculated according to Formula (1), a peak occurs when a delay time (or shift time) $\tau$ is zero, and a range sidelobe is present when the delay time $\tau$ is not zero. Similarly, as shown in FIG. 13(b), in an auto-correlation value calculation result $R_{bb}(\tau)$ of the complementary code sequence b calculated according to Formula (2), a peak occurs when the delay time $\tau$ is zero, and a range sidelobe is present when the delay time $\tau$ is not zero.

As shown in FIG. 13(c), in an added value of the auto-correlation value calculation results ($R_{aa}(\tau)$, $R_{bb}(\tau)$), a peak occurs when the delay time $\tau$ is zero, and a range sidelobe is not present and zero is obtained when the delay time $\tau$ is not zero. Hereinafter, the peak occurring when the delay time $\tau$ is zero is referred to as a "main lobe". This relationship is expressed by Formula (3). In (a) to (c) of FIG. 13, the transverse axis represents a delay time ($\tau$) in auto-correlation value calculation, and the longitudinal axis represents a calculated auto-correlation value calculation result.

[Exp. 3]

$$R_{aa}(\tau)+R_{bb}(\tau)\neq 0, \text{when } \tau=0$$

$$R_{aa}(\tau)+R_{bb}(\tau)=0, \text{when } \tau\neq 0 \quad (3)$$

In a case where a mixed signal of reflected waves from a target in a short distance and a target in a long distance is received, in general, it is known that as the code length of the codes passed through pulse compression is increased, a necessary reception dynamic range is increased.

However, using the above-mentioned complementary codes, it is possible to decrease a peak sidelobe in a shorter code length. Thus, in the complementary codes using a short code length, in a case where the mixed signal of the reflected waves from the target in a short distance and the target in a long distance is received, it is also possible to decrease a reception dynamic range.

Further, as an example of the above-mentioned radar device, a configuration has been disclosed in which when a target is detected, a plurality of radars is provided that respectively measures individual measurement areas. In the related art, a wide area radar device has been proposed that individually controls the plurality of radars and detects the target in each measurement area.

Hereinafter, each radar that respectively measures the individual measurement area when the target is detected is referred to as a "sector radar". The respective measurement areas of the respective sector radars are individually separated, but may be partially overlapped with each other in a case where the measurement areas are close to each other.

As mentioned above, in the wide area radar device in the related art, in a case where the measurement areas of the respective sector radars are close to each other, interference occurs between the transmission signals transmitted from the respective sector radars. In a case where the interference occurs, the wide area radar device in the related art causes a problem that position measurement estimation accuracy of the target is deteriorated.

With regard to the above problem, in order to reduce the occurrence of interference between the sector radars in the wide area radar device in the related art, the following methods have been studied.

A first method is to divide a frequency band used by each sector radar into a plurality of different frequency bands or frequency bands (sub-bands) of a predetermined narrow band and to perform FDM (frequency division multiplexing) for a transmission signal to transmit the transmission signal.

According to the first method, it is possible to suppress the occurrence of interference between the respective sector radars by using the different frequency bands, but the following problem arises. That is, in the former case where the plurality of different frequency bands is used, there is a problem that a large amount of frequency resources are necessary. Further, in the latter case where the frequency bands of the narrow band are used, there is a problem that time resolution of position measurement estimation (corresponding to distance resolution) of a target in each sector radar is reduced.

A second method is to perform CDM (code division multiplexing) for a transmission signal using a plurality of code sequences having low cross-correlation to transmit the transmission signal, in each sector radar. According to the second method, addition of new frequency bands and sub-bands is not necessary, and thus, time resolution of position measurement estimation of a target in each sector radar is not reduced.

However, in a case where the transmission signal passes through CDM for each sector radar for transmission, the transmission signal is asynchronously received from a different sector radar, and as a result, interference between codes occurs between the respective sector radars. Further, in general, an auto-correlation characteristic of a code sequence having low cross-correlation is not superior, and as a result, a range sidelobe becomes large.

Thus, in the radar device in the related art, there is a problem that detection performance is deteriorated in a case where a mixed signal of a plurality of reflected waves from a target present in a short distance and a target present in a long distance is separated to detect each target.

A third method is to use a perfect complementary sequence system disclosed in PTL 1, in which low range sidelobe characteristics of complementary codes is satisfied and interference between codes occurring between respective sector radars is reduced.

Two radar systems A and B disclosed in PTL 1 perform transmission and reception, using different coded pulses that are P1 and P2 in the radar system A and Q1 and Q2 in the radar system B as coded pulses of perfect complementary sequences, and using a carrier wave of the same frequency band.

In this case, in a case where a plurality of coded pulses transmitted from a host radar system is received, a plurality of auto-correlation function signals $R_{P1P1}(\tau)$ and $R_{P2P2}(\tau)$ or $R_{Q1Q1}(\tau)$ and $R_{Q2Q2}(\tau)$ respectively corresponding to the plurality of coded pulses P1 and P2 or Q1 and Q2 is output. On the other hand, in a case where the host radar system receives a plurality of coded pulses transmitted from a different radar system, a plurality of cross-correlation function signals $R_{Q1P1}(\tau)$ and $R_{Q2P2}(\tau)$ or $P_{F1Q1}(\tau)$ and $R_{P2Q2}(\tau)$ respectively corresponding to the plurality of coded pulses transmitted from the different radar system is output.

From a characteristic of the perfect complementary sequences, the sum ($R_{P1P1}(\tau)+R_{P2P2}(\tau)$ or $R_{Q1Q1}(\tau)+R_{Q2Q2}(\tau)$) of a plurality of outputs of auto-correlation function signals is 0 when $\tau$ is not 0, and the sum ($R_{Q1P1}(\tau)+R_{Q2P2}(\tau)$ or $P_{P1O1}(\tau)+R_{P2Q2}(\tau)$) of a plurality of outputs of cross-correlation function signals is 0 regardless of $\tau$. Thus, with respect to the plurality of coded pulses (P1 and P2 or Q1 and Q2) transmitted from the host radar system, the reception side performs a reception process of calculating the plurality of corresponding auto-correlation function signals to thereby obtain compressed pulses with no sidelobe. Similarly, in a case where the plurality of coded pulses transmitted from the different radar system is received, signal components of the different radar system may be set to 0 in a process of calculating the sum of the auto-correlation function signals. Thus, it is possible to provide a plurality of radar systems with no mutual interference even using the same frequency band in adjacent frequency bands.

CITATION LIST

Patent Literature

[PTL 1] JP-A-61-096482

Non Patent Literature

[NPL 1] BUDISIN, S. Z, "NEW COMPLEMENTARY PAIRS OF SEQUENCES", Electron, Lett., 26 (13), pp. 881-883 (1990)

SUMMARY OF INVENTION

Technical Problem

However, in a case where time division transmission is performed using the perfect complementary sequences as disclosed in PTL 1, the radar system receives the influence of phase change due to the Doppler effect according to movement of a target. Thus, in the above-mentioned wide area radar device in the related art, as a result, the range sidelobe level is increased, and a suppression characteristic between transmission codes between the sector radars is deteriorated.

That is, in a case where the radar device transmits a high frequency transmission signal generated on the basis of complementary codes $a_n$ and $b_n$ in a time division manner at each transmission cycle and receives a reception signal with respect to the high frequency transmission signal, the reception signal receives a phase change $\theta(t)$ caused by a Doppler frequency displacement fd according to movement of the target, as expressed in Formula (4). Thus, the range sidelobe level does not become 0 but is increased, and thus, the low range sidelobe characteristics and the interference suppression characteristic between the sector radars are deteriorated in the wide area radar device in the related art. Here, a parameter t represents time.

[Exp. 4]

$$\theta(t) = 2\pi \times fd \times t \quad (4)$$

The deterioration of the low range sidelobe characteristics of the wide area radar device as mentioned above will be described with reference to FIG. 14. FIG. 14 is a diagram illustrating a transmission cycle Tr and complementary codes $a_n$ and $b_n$ that are transmission codes used in transmission at each transmission cycle Tr in the respective sector radars of the wide area radar device in the related art.

In FIG. 14, the high frequency transmission signal generated on the basis of the complementary code $a_n$ is transmitted as the transmission code at the initial transmission cycle Tr. The high frequency transmission signal generated on the basis of the complementary code $b_n$ is transmitted as the transmission code at the next transmission cycle Tr.

In FIG. 14, a parameter Tp represents a transmission time per pulse corresponding to a pulse code having a code length L. A parameter Tc represents a transmission time in a transmission section of the high frequency transmission signal respectively generated on the basis of the complementary code $a_n$ or $b_n$ having the code length L. Between the parameter Tp, the parameter Tc and the parameter L, Formula (5) is established.

[Exp. 5]

$$T_c = T_p \times L \quad (5)$$

In FIG. 14, after the high frequency transmission signal generated on the basis of the complementary code $a_n$ is transmitted, a signal of a reflected wave for the high frequency transmission signal generated on the basis of the complementary code $b_n$ is received at the next, transmission cycle Tr. Here, the signal of the reflected wave is subject to the phase change $\theta(t)$ shown in the above-mentioned Formula (4).

Thus, in each sector radar of the wide area radar device, it is difficult to obtain an ideal low range sidelobe characteristics according to the size of the product of the transmission cycle Tr and the Doppler frequency fd included in the signal of the reflected wave. As a result, the low range sidelobe characteristics of the wide area radar device are deteriorated.

Further, due to the deterioration of the low range sidelobe characteristics, a suppression characteristic of interference between the respective sector radars is deteriorated.

Thus, in the wide area radar device in the related art, due to the deterioration of the low range sidelobe characteristics, a main lobe of a signal of a reflected wave from a target present in a relatively distant position is buried in a range sidelobe of a signal of a reflected wave from a target present in a relatively near position. In this case, in the wide area radar device in the related art, detection accuracy of the target present in a distant position is deteriorated. For this reason, measurement performance of the wide area radar device is noticeably influenced, and thus, the suppression characteristic of interference between the respective sector radars is deteriorated according to the deterioration of the low range sidelobe characteristics.

Accordingly, an object of the invention is to provide a radar device that maintains low range sidelobe characteristics in a signal of a reflected wave from a target and reduces interference between codes between a plurality of sector radars even in a case where the target moves.

Solution to Problem

According to an aspect of the invention, there is provided a radar device including: a first transmission signal generator that determines codes of a first code sequence having a first code length according to a first rule and generates a modulated first transmission signal, and determines codes of a second code sequence having a first code length according to the first rule and generates a modulated second transmission signal; a first RF transmitter that converts the first transmission signal into a high frequency transmission signal and transmits the result through a first transmission antenna at a first transmission cycle, and converts the second transmission signal into a high frequency transmission signal and transmits the result through the first transmission antenna at a second transmission cycle; a second transmission signal generator that determines codes of the second code sequence according to the first rule and generates a modulated third transmission signal, and determines codes of the first code sequence according to the first rule and generates a modulated fourth transmission signal; and a second RF transmitter that converts the third transmission signal into a high frequency transmission signal and transmits the result through a second transmission antenna at the first transmission cycle, and converts the fourth transmission signal into a high frequency transmission signal and transmits the result through the second transmission antenna at the second transmission cycle, wherein when a code of at least one transmission signal among the first transmission signal, the second transmission signal, the third transmission signal and the fourth transmission signal is set to be negative, the first rule is any one of a combination of a negative code and a positive code and a combination of the positive code and the positive code at each transmission cycle.

Advantageous Effects of Invention

According to the radar device of the invention, it is possible to maintain low range sidelobe characteristics in a signal of a reflected wave from a target and to reduce interference between a plurality of sector radars even in a case where the target moves.

BRIEF DESCRIPTION OF DRAWINGS

FIG. 12 is a diagram illustrating a generation procedure of a code sequence of complementary codes.

FIG. 13 is a diagram illustrating characteristics of complementary codes, in which (a) is a diagram illustrating an auto-correlation calculation result of one complementary code sequence. (b) is a diagram illustrating an auto-correlation calculation result of the other complementary code sequence, and (c) is a diagram illustrating a value obtained by adding the auto-correlation calculation results of two complementary code sequences.

DESCRIPTION OF EMBODIMENTS

Hereinafter, embodiments of the invention will be described with reference to the accompanying drawings. In the following description, a reception signal received by a wide area radar device according to the invention includes a signal of a reflected wave obtained as a high frequency transmission signal transmitted from the wide area radar device is reflected by a target, and a noise signal around the wide area radar device.

First Embodiment

Figure 1:
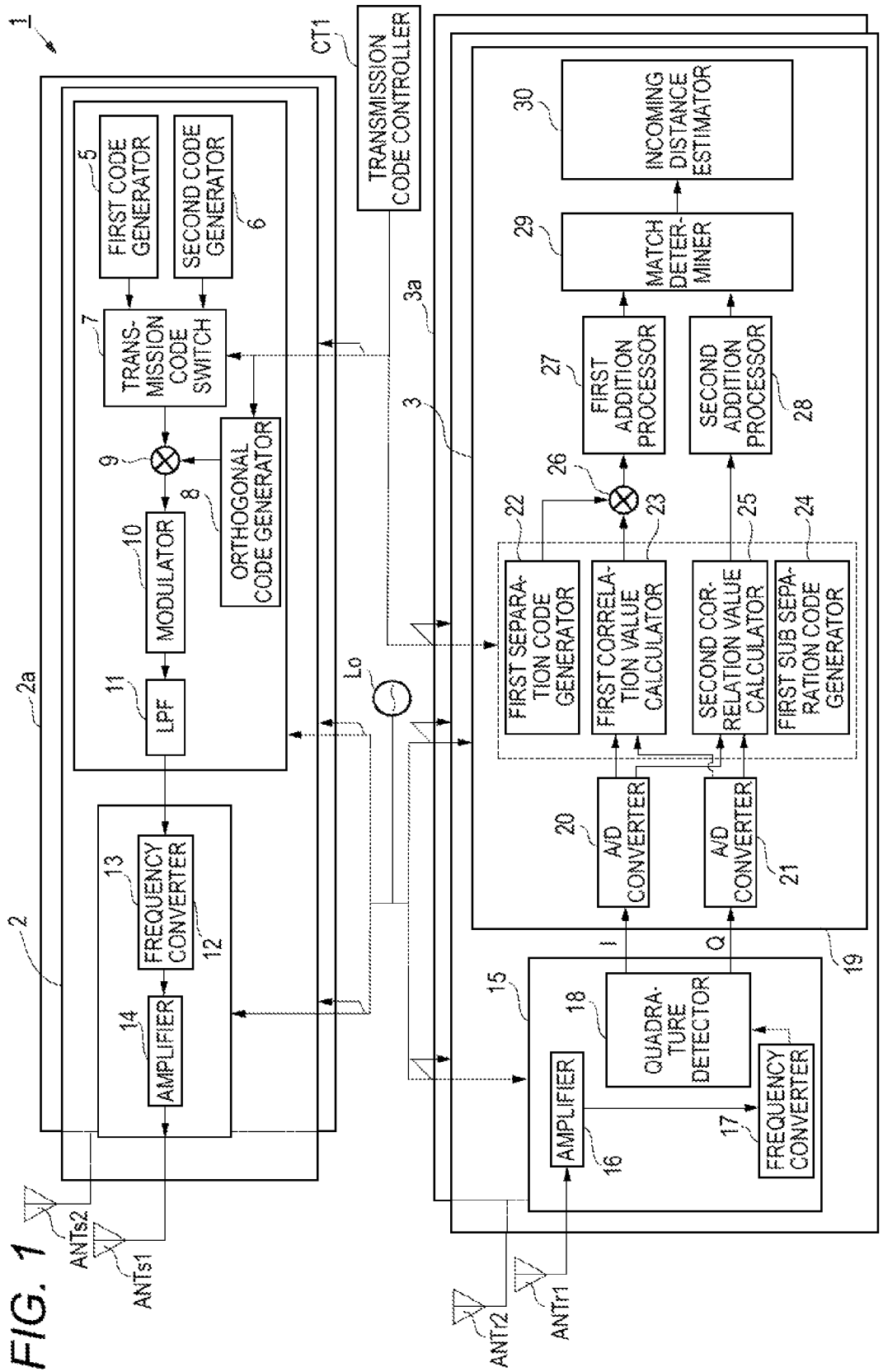
FIG. 1 is a block diagram illustrating an internal configuration of a wide area radar device according to a first embodiment.
Figure 2:
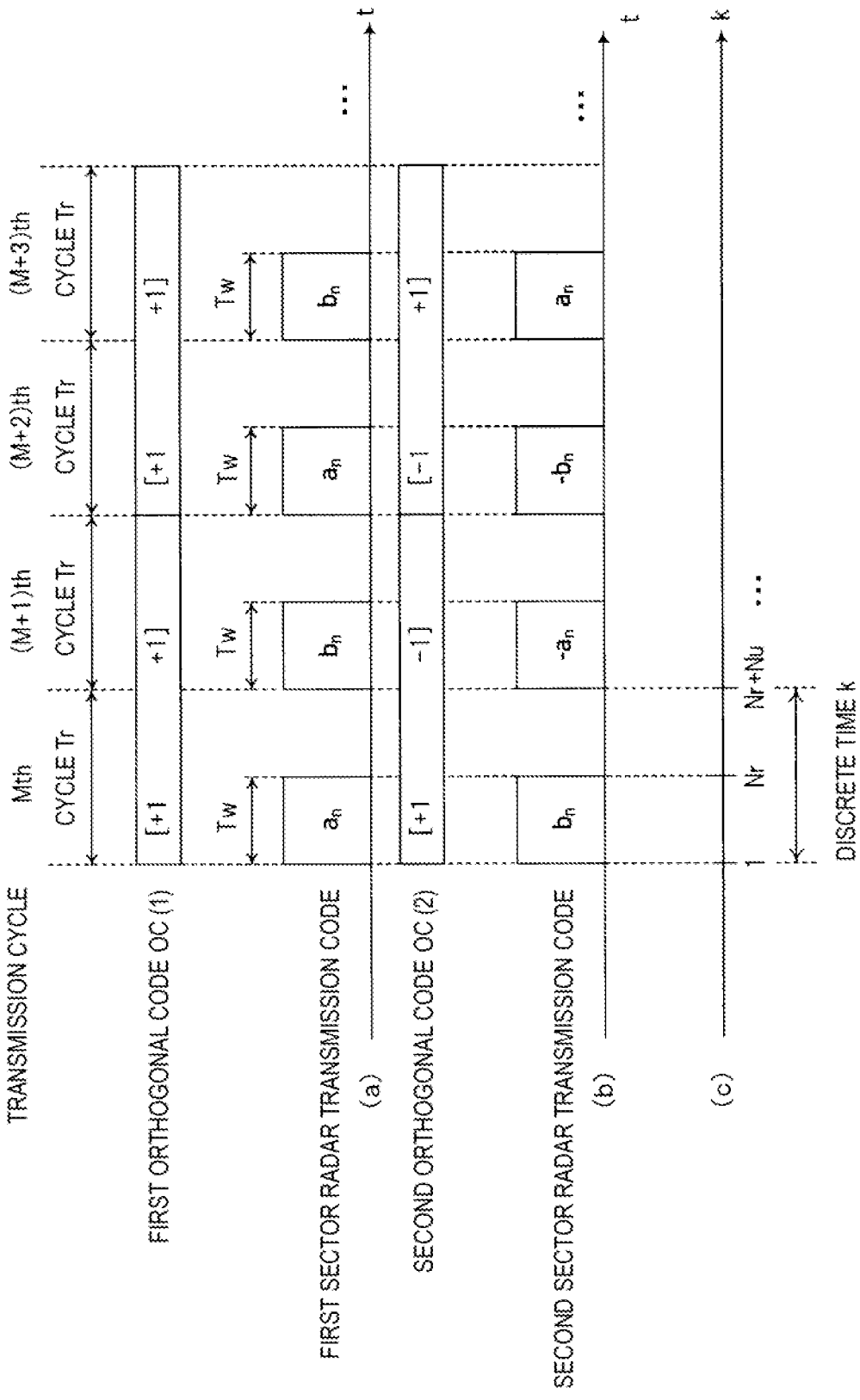
FIG. 2 is a timing chart relating to an operation of the wide area radar device according to the first embodiment, in which (a) is a diagram illustrating a first orthogonal code OC (1) and a transmission code of a first sector radar at each transmission cycle Tr, (b) is a diagram illustrating a second orthogonal code OC (2) and a transmission code of a second sector radar at each transmission cycle Tr, and (c) is a diagram illustrating the relationship between each transmission cycle Tr and a discrete time k.

A configuration and an operation of a wide area radar device 1 according to a first embodiment will be described with reference to FIG. 1 and FIG. 2. FIG. 1 is a block diagram illustrating an internal configuration of the wide area radar device 1 according to the first embodiment. FIG. 2 is a timing chart relating to the operation of the wide area radar device 1 according to the first embodiment. (a) in FIG. 2 is a diagram illustrating a first orthogonal code OC (1) and a transmission code of a first sector radar at each transmission cycle Tr, (b) in FIG. 2 is a diagram illustrating a second orthogonal code OC (2) and a transmission code of a second sector radar at each transmission cycle Tr, and (c) in FIG. 2 is a diagram illustrating the relationship between each transmission cycle Tr and a discrete time k.

As shown in FIG. 1, the wide area radar device 1 includes a reference signal oscillator Lo, a transmission code controller CT1, a first sector radar transmitter 2 to which a first transmission antenna ANTs1 is connected, a first sector radar receiver 3 to which a first reception antenna ANTr1 is connected, a second sector radar transmitter 2a to which a second transmission antenna ANTs2 is connected, and a second sector radar receiver 3a to which a second reception antenna ANTr2 is connected.

The wide area radar device 1 includes two radars of a first sector radar and a second sector radar that commonly have the reference signal oscillator Lo and the transmission code controller CT1. The first sector radar includes the first sector radar transmitter 2 and the first sector radar receiver 3. The second sector radar includes the second sector radar transmitter 2a and the second sector radar receiver 3a.

A signal from the reference signal oscillator Lo and a signal from the transmission code controller CT1 are synchronously provided to control the respective sector radars. Respective measurement areas of the first sector radar and the second sector radar may be partially overlapped in a case where the measurement areas of the respective sector radars are close to each other, but it is assumed that the measurement areas are basically different from each other.

In the wide area radar device 1, the first sector radar transmitter 2 and the second sector radar transmitter 2a generate a predetermined intermittent high frequency transmission signal, respectively, to transmit the result through the first transmission antenna ANTs1 and the second transmission antenna ANTs2. Further, the first sector radar receiver 3 and the second sector radar receiver 3a receive a signal of a reflected wave obtained as each transmitted high frequency phase transmission signal is reflected by a target, through the first reception antenna ANTr1 and the second reception antenna ANTr2.

The wide area radar device 1 processes reception signals that are respectively received by the first sector radar receiver 3 and the second sector radar receiver 3a, and detects the presence or absence of the target. The target is an object detected by the wide area radar device 1, for example, a car, a human or the like, which is similarly applied to the following respective embodiments.

Since the first sector radar and the second sector radar have the same configuration and are operated in the same way, in the following description of the configuration and operation of the wide area radar device 1, the configuration and operation of the first sector radar will be mainly described, and the configuration and operation of the second sector radar will be described as necessary.

Particularly, with respect to the configuration of the second sector radar is not explicitly described, the same operation as in the description of the corresponding configuration of the first sector radar is performed.

Further, since the configuration of the second sector radar is not explicitly described, in the description of the corresponding configuration of the first sector radar, when an expression of a u-th sector radar is used, if u is replaced with 2, this represents description of the operation of the second sector radar.

The first sector radar transmitter 2 will be described. The first sector radar transmitter 2 includes a transmission signal generator 4, a transmission RF (Radio Frequency) unit 12, and the first transmission antenna ANTs1. The transmission signal generator 4 includes a first code generator 5, a second code generator 6, a transmission code switch 7, an orthogonal code generator 8, an orthogonal code multiplier 9, a modulator 10, and an LPF (Low Pass Filter) 11. In FIG. 1, the transmission signal generator 4 is configured to include the LPF 11, but the LPF 11 may be provided in the first sector radar transmitter 2, independently from the transmission signal generator 4. The RF transmitter 12 includes a frequency converter 13 and an amplifier 14.

The second sector radar transmitter 2a will be described. A configuration of the second sector radar transmitter 2a is not shown in FIG. 1, but includes a transmission signal generator 4a, a RF transmitter 12a, and the second transmission antenna ANTs2, in a similar way to the first sector radar transmitter 2. The transmission signal generator 4a includes a first code generator 5a, a second code generator 6a, a transmission code switch 7a, an orthogonal code generator 8a, an orthogonal code multiplier 9a, a modulator 10a, and an LPF 11a. The RF transmitter 12a includes a frequency converter 13a and an amplifier 14a.

The transmission signal generator 4 generates, on the basis of a reference signal generated by the reference signal oscillator Lo, a signal obtained by multiplying the reference signal by a predetermined multiple. The respective units of the transmission signal generator 4 are operated on the basis of the generated signal.

The transmission signal generator 4 modulates pulse compression codes of complementary code sequences $a_n$ and $b_n$ that respectively have a code length L, and periodically generates a transmission signal r(k, M) of a baseband shown in Formula (6). Here, a parameter n=1, ..., L, and a parameter L represents the code length of the complementary code sequences $a_n$ and $b_n$. A parameter j represents an imaginary unit that satisfies $j^2=-1$. A parameter k represents a discrete time that satisfies k=1 to (Nr+Nu). The range of the discrete time k is similarly applied to the respective embodiments to be described later.

The transmission signal r(k, M) of the baseband shown in Formula (6) represents a transmission signal at the discrete time k at an M-th transmission cycle Tr, and is expressed as a result obtained by adding an in-phase component Ir(k, M) and an orthogonal component Qr(k, M) multiplied by the imaginary unit j.

[Exp. 6]

$$r(k,M)=Ir(k,M)+(k,M)+jQr(k,M) \qquad (6)$$

Further, it is assumed that the transmission signals generated by the transmission signal generator 4 are not continuous signals. As shown in FIG. 2(a), for example, in a transmission section Tw (second) of each transmission cycle Tr from an M-th order to an (M+3)-th order, No (items of) samples are present per one pulse code, with respect to the complementary code sequences $a_n$ and $b_n$ having the code length L. A parameter M is a natural number. Accordingly, Nr (=No×L) samples are included in the transmission section Tw. Further, in a non-transmission section (Tr−Tw) (second) of each transmission cycle Tr from the M-th order to the (M+3)-th order, it is assumed that Nu (items of) samples are present as a baseband transmission signal.

First, configurations and operations of respective units of the transmission signal generator 4 will be described.

The first code generator 5 generates a transmission code for pulse compression of the complementary code sequence $a_n$ that forms a pair of the complementary code sequences having the code length L. The first code generating section 5 outputs the generated transmission signal of the complementary code sequence $a_n$ to the transmission code switch 7. Hereinafter, the transmission signal of the complementary code sequence $a_n$ is referred to as a transmission code $a_n$ for ease of description.

The second code generator 6 generates a transmission code for pulse compression of the complementary code sequence $b_n$ that forms a pair of the complementary code sequences having the code length L. The second code generating section 6 outputs the generated transmission signal of the complementary code sequence $b_n$ to the transmission code switch 7. Hereinafter, the transmission signal of the complementary code sequence $b_n$ is referred to as a transmission code $b_n$ for ease of description.

The transmission code switch 7 receives inputs of the transmission codes $a_n$ and $b_n$ that are respectively output from the first code generator 5 and the second code generator 6. The transmission code switch 7 selectively switches the input transmission code $a_n$ or the transmission code $b_n$ on the basis of a code switching control signal from the transmission code controller CT1, and outputs the switched transmission code to the orthogonal code multiplier 9.

The transmission code controller CT1 controls the transmission code switch 7 so as to perform selective switching into the transmission code $a_n$ or the transmission code $b_n$ at each transmission cycle Tr, with respect to the first sector radar transmitter 2. Specifically, the transmission code controller CT1 outputs a code switching control signal indicating that the transmission code is to be selectively switched at each transmission cycle Tr with respect to the first sector radar transmitter 2, to the transmission code switch 7. The transmission code controller CT1 also outputs the code switching control signal to the orthogonal code generator 8 and the first sector radar receiver 3, respectively, with respect to the first sector radar transmitter 2.

The transmission code controller CT1 similarly controls the transmission code switch 7a so as to perform selective switching into the transmission code $a_n$ or the transmission code $b_n$ at each transmission cycle Tr, with respect to the second sector radar transmitter 2a. Specifically, the transmission code controller CT1 outputs a code switching control signal indicating that the transmission code is to be selectively switched at each transmission cycle Tr with respect to the second sector radar transmitter 2a, to the transmission code switch 7a. The transmission code controller CT1 also outputs the code switching control signal to the orthogonal code generator 8a and the second sector radar receiver 3a, respectively, with respect to the second sector radar transmitter 2a.

Here, the operation of the transmission code controller CT1 will be specifically described with reference to FIG. 2(a) and FIG. 2(b). The transmission code controller CT1 outputs different code switching control signals to a set of the transmission signal generator 4 and the orthogonal code generator 8, and a set of the transmission signal generator 4a and the orthogonal code generator 8a.

The transmission code controller CT1 controls the transmission code switch 7 to output the transmission code $a_n$ to the orthogonal code multiplier 9 at the M-th transmission cycle Tr. Accordingly, the transmission code controller CT1 respectively outputs a code switching control signal indicating that the transmission code is to be selectively switched into the transmission code $a_n$ at the M-th transmission cycle Tr, to the transmission code switch 7 and the orthogonal code generator 8.

Further, the transmission code controller CT1 controls the transmission code switch 7a to output the transmission code $b_n$ to the orthogonal code multiplier 9a at the M-th transmission cycle Tr. Accordingly, the transmission code controller CT1 respectively outputs a code switching control signal indicating that the transmission code is to be selectively switched into the transmission code $b_n$ at the M-th transmission cycle Tr, to the transmission code switch 7a and the orthogonal code generator 8a.

The transmission code controller CT1 controls the transmission code switch 7 to output the transmission code $b_n$ to the orthogonal code multiplier 9 at the (M+1)-th transmission cycle Tr. Accordingly, the transmission code controller CT1 respectively outputs a code switching control signal indicating that the transmission code is to be selectively switched into the transmission code $b_n$ at the (M+1)-th transmission cycle Tr, to the transmission code switch 7 and the orthogonal code generator 8.

Further, the transmission code controller CT1 controls the transmission code switch 7a to output the transmission code $a_n$ to the orthogonal code multiplier 9a at the (M+1)-th transmission cycle Tr. Accordingly, the transmission code controller CT1 respectively outputs a code switching control signal indicating that the transmission code is to be selectively switched into the transmission code $a_n$ at the (M+1)-th transmission cycle Tr, to the transmission code switch 7a and the orthogonal code generator 8a.

The transmission code controller CT1 controls the transmission code switch 7 to output the transmission code $a_n$ to the orthogonal code multiplier 9 at the (M+2)-th transmission cycle Tr. Accordingly, the transmission code controller CT1 respectively outputs a code switching control signal indicating that the transmission code is to be selectively switched into the transmission code $a_n$ at the (M+2)-th transmission cycle Tr, to the transmission code switch 7 and the orthogonal code generator 8.

Further, the transmission code controller CT1 controls the transmission code switch 7a to output the transmission code $b_n$ to the orthogonal code multiplier 9a at the (M+2)-th transmission cycle Tr. Accordingly, the transmission code controller CT1 respectively outputs a code switching control signal indicating that the transmission code is to be selectively switched into the transmission code $b_n$ at the (M+2)-th transmission cycle Tr, to the transmission code switch 7a and the orthogonal code generator 8a.

The transmission code controller CT1 controls the transmission code switch 7 to output the transmission code $b_n$ to the orthogonal code multiplier 9 at the (M+3)-th transmission cycle Tr. Accordingly, the transmission code controller CT1 respectively outputs a code switching control signal indicating that the transmission code is to be selectively switched into the transmission code $b_n$ at the (M+3)-th transmission cycle Tr, to the transmission code switch 7 and the orthogonal code generator 8.

Further, the transmission code controller CT1 controls the transmission code switch 7a to output the transmission code $a_n$ to the orthogonal code multiplier 9a at the (M+3)-th transmission cycle Tr. Accordingly, the transmission code controller CT1 respectively outputs a code switching control signal indicating that the transmission code is to be selectively switched into the transmission code $a_n$ at the (M+3)-th transmission cycle Tr, to the transmission code switch 7a and the orthogonal code generator 8a.

At an (M+4)-th transmission cycle and thereafter, using four transmission cycles (4Tr) from the M-th transmission cycle to the (M+3)-th transmission cycle as one unit, shown in FIG. 2(a), the transmission code according to each transmission cycle in the unit is repeatedly generated. The generated transmission code is output to the transmission code switch 7 and the transmission code switch 7a, respectively, according to each transmission cycle in the unit.

The orthogonal code generator 8 receives an input of the code switching control signal output from the transmission code controller CT1. The orthogonal code generator 8 generates a different orthogonal code OC for each sector radar, in order to enable separation of the high frequency transmission signal transmitted from the first sector radar or the second sector radar. Accordingly, the orthogonal code OC (1) generated by the orthogonal code generator 8 and the orthogonal code OC (2) generated by the orthogonal code generator 8a are different codes.

Specifically, in a case where the number Ns of the sector radars as shown in FIG. 1 is 2, the orthogonal code generator 8 generates the orthogonal code OC (1) that has a code length P=4 of the orthogonal code OC and has an orthogonal relationship. A parameter P represents the code length of the orthogonal code OC. For example, the orthogonal code generator 8 generates the orthogonal code OC (1)=[1, 1, 1, 1].

Similarly, in a case where the number Ns of the sector radars is 2, the orthogonal code generator 8a generates the orthogonal code OC (2) orthogonal to the orthogonal code OC (1). For example, the orthogonal code generator 8a generates the orthogonal code OC (2)=[1, −1, −1, 1].

In the orthogonal code OC (1) of the code length P=4, a first half orthogonal code OCa (1) (=[1, 1]) and a second half orthogonal code OCb (1) (=[1, 1]) have the same code, that is, the same polarity. Thus, Formula (7) is established between the orthogonal code OCa (1) and the orthogonal code OCb (1).

[Exp. 7]

$$OCa(1)=OCb(1) \qquad (7)$$

On the other hand, in the orthogonal code OC (2) of the code length P=4, a first half orthogonal code OCa (2) (=[1, −1]) and a second half orthogonal code OCb (2) (=[−1, 1]) have opposite codes, that is, reversed polarities. Thus, Formula (8) is established between the orthogonal code OCa (2) and the orthogonal code OCb (2). Hereinafter, a q-th element of the orthogonal code OC (u) is expressed as OC (q, u). A parameter u is 1, . . . , Ns. A parameter q is a natural number.

[Exp. 8]

$$OCa(2)=-OCb(2) \qquad (8)$$

Here, the operations of the orthogonal code generator 8 and the orthogonal code generator 8a will be specifically described with reference to FIG. 2(a) and FIG. 2(b). The orthogonal code generator 8 and the orthogonal code generator 8a outputs the respectively generated orthogonal code OC (1) and OC (2) to the orthogonal code multiplier 9 and the orthogonal code multiplier 9a, respectively.

The orthogonal code generator 8 generates an orthogonal code OC (1)=[1, 1, 1, 1] used at each transmission cycle Tr from the M-th order to the (M+3)-th order, according to the code switching control signal output from the transmission code controller CT1. Here, as shown in FIG. 2, the M-th transmission cycle Tr is the first transmission cycle of four transmission cycles in the operations of the respective units of the wide area radar device 1 including the above-described transmission code controller CT1, which is similarly applied to the following respective embodiments.

Specifically, the orthogonal code generator 8 generates an orthogonal code OC (1, 1) used at the M-th transmission cycle Tr according to the code switching control signal output from the transmission code controller CT1, and outputs the result to the orthogonal code multiplier 9. In FIG. 2, the orthogonal code OC (1, 1) is +1.

The orthogonal code generator 8 generates an orthogonal code OC (2, 1) used at the (M+1)-th transmission cycle Tr according to the code switching control signal output from the transmission code controller CT1, and outputs the result to the orthogonal code multiplier 9. In FIG. 2, the orthogonal code OC (2, 1) is +1.

The orthogonal code generator 8 generates an orthogonal code OC (3, 1) used at the (M+2)-th transmission cycle Tr according to the code switching control signal output from the transmission code controller CT1, and outputs the result to the orthogonal code multiplier 9. In FIG. 2, the orthogonal code OC (3, 1) is +1.

The orthogonal code generator 8 generates an orthogonal code OC (4, 1) used at the (M+3)-th transmission cycle Tr according to the code switching control signal output from the transmission code controller CT1, and outputs the result to the orthogonal code multiplier 9. In FIG. 2, the orthogonal code OC (4, 1) is +1.

The orthogonal code generator 8a generates an orthogonal code OC (2)=[1, −1, −1, 1] used at each transmission cycle Tr from the M-th order to the (M+3)-th order, according to the code switching control signal output from the transmission code controller CT1.

Specifically, the orthogonal code generator 8a generates an orthogonal code OC (1, 2) used at the M-th transmission cycle Tr according to the code switching control signal from the transmission code controller CT1, and outputs the result to the orthogonal code multiplier 9a. In FIG. 2, the orthogonal code OC (1, 2) is +1.

The orthogonal code generator 8a generates an orthogonal code OC (2, 2) used at the (M+1)-th transmission cycle Tr according to the code switching control signal from the transmission code controller CT1, and outputs the result to the orthogonal code multiplier 9a. In FIG. 2, the orthogonal code OC (2, 2) is −1.

The orthogonal code generator 8a generates an orthogonal code OC (3, 2) used at the (M+2)-th transmission cycle Tr according to the code switching control signal from the transmission code controller CT1, and outputs the generated code to the orthogonal code multiplier 9a. In FIG. 2, the orthogonal code OC (3, 2) is −1.

The orthogonal code generator 8a generates an orthogonal code OC (4, 2) used at the (M+3)-th transmission cycle Tr according to the code switching control signal from the transmission code controller CT1, and outputs the generated code to the orthogonal code multiplier 9a. In FIG. 2, the orthogonal code OC (4, 2) is +1.

At the (M+4)-th transmission cycle and thereafter, using four transmission cycles (4Tr) from the M-th transmission cycle to the (M+3)-th transmission cycle as one unit, shown in FIG. 2(a), the orthogonal code according to each transmission cycle in the unit is repeatedly generated. The generated orthogonal code is output to the orthogonal code multiplier 9 and the orthogonal code multiplier 9a, respectively, according to each transmission cycle in the unit.

The orthogonal code multiplier 9 receives inputs of the transmission code output from the transmission code generator 7 and the orthogonal code output from the orthogonal code generator 8. The orthogonal code multiplier 9 multiplies the transmission code output from the transmission code switch 7 and the orthogonal code output from the orthogonal code generator 8. The orthogonal code multiplier 9 outputs a transmission code that is the multiplication result to the modulator 10.

For example, in FIG. 2(a), at the M-th transmission cycle Tr, a case where the transmission code output from the transmission code switch 7 is $a_n$ and the orthogonal code OC (1, 1) output from the orthogonal code generator 8 is 1 is shown. In this case, the orthogonal code multiplier 9 outputs a transmission code $a_n$ that is a multiplication result of the transmission code $a_n$ and the orthogonal code OC (1, 1) (=1), to the modulator 10.

For example, in FIG. 2(a), at the (M+1)-th transmission cycle Tr, a case where the transmission code output from the transmission code switch 7 is $b_n$ and the orthogonal code OC (2, 1) output from the orthogonal code generator 8 is 1 is shown. In this case, the orthogonal code multiplier 9 outputs a transmission code $b_n$ that is a multiplication result of the transmission code $b_n$ and the orthogonal code OC (2, 1) (=1), to the modulator 10.

For example, in FIG. 2(*a*), at the (M+2)-th transmission cycle Tr, a case where the transmission code output from the transmission code switch 7 is $a_n$ and the orthogonal code OC (3, 1) output from the orthogonal code generator 8 is 1 is shown. In this case, the orthogonal code multiplier 9 outputs a transmission code $a_n$ that is a multiplication result of the transmission code $a_n$ and the orthogonal code OC (3, 1) (=1), to the modulator 10.

For example, in FIG. 2(*a*), at the (M+3)-th transmission cycle Tr, a case where the transmission code output from the transmission code switch 7 is $b_n$ and the orthogonal code OC (4, 1) output from the orthogonal code generator 8 is 1 is shown. In this case, the orthogonal code multiplier 9 outputs a transmission code $b_n$ that is a multiplication result of the transmission code $b_n$ and the orthogonal code OC (4, 1) (=1), to the modulator 10.

For example, in FIG. 2(*b*), at the M-th transmission cycle Tr, a case where the transmission code output from the transmission code switch 7*a* is $b_n$ and the orthogonal code OC (1, 2) output from the orthogonal code generator 8*a* is 1 is shown. In this case, the orthogonal code multiplier 9*a* outputs a transmission code $b_n$ that is a multiplication result of the transmission code $b_n$ and the orthogonal code OC (1, 2) (=1), to the modulator 10*a*.

For example, in FIG. 2(*b*), at the (M+1)-th transmission cycle Tr, a case where the transmission code output from the transmission code switch 7*a* is $a_n$ and the orthogonal code OC (2, 2) output from the orthogonal code generator 8*a* is −1 is shown. In this case, the orthogonal code multiplier 9*a* outputs a transmission code $-a_n$ that is a multiplication result of the transmission code $a_n$ and the orthogonal code OC (2, 2) (=−1), to the modulator 10*a*.

For example, in FIG. 2(*b*), at the (M+2)-th transmission cycle Tr, a case where the transmission code output from the transmission code switch 7*a* is $b_n$ and the orthogonal code OC (3, 2) output from the orthogonal code generator 8*a* is −1 is shown. In this case, the orthogonal code multiplier 9*a* outputs a transmission code $-b_n$ that is a multiplication result of the transmission code $b_n$ and the orthogonal code OC (3, 2) (=−1), to the modulator 10*a*.

For example, in FIG. 2(*b*), at the (M+3)-th transmission cycle Tr, a case where the transmission code output from the transmission code switch 7*a* is $a_n$ and the orthogonal code OC (4, 2) output from the orthogonal code generator 8*a* is 1 is shown. In this case, the orthogonal code multiplier 9*a* outputs a transmission code $a_n$ that is a multiplication result of the transmission code $a_n$ and the orthogonal code OC (4, 2) (=1), to the modulator 10*a*.

The modulator 10 receives an input of the transmission code output from the orthogonal code multiplier 9. The modulator 10 pulse-modulates the input transmission code to generate a baseband transmission signal r(n). The pulse modulation is amplitude modulation, ASK (Amplitude Shift Keying), or PSK (Phase Shift Keying). Further, the modulator 10 outputs a transmission signal r(n) having a predetermined limited band or lower in the generated transmission signal r(n) to the RF transmitter 12 through the LPF 11.

Next, configurations and operations of respective units of the RF transmitter 12 will be described.

The RF transmitter 12 generates, on the basis of the reference signal generated by the reference signal oscillator Lo, a signal obtained by multiplying the reference signal by a predetermined multiple. The RF transmitter 12 is operated on the basis of the generated signal.

Specifically, the frequency converter 13 receives an input of the transmission signal r(n) generated by the transmission signal generating section 4, and up-converts the received baseband transmission signal r(n) to generate a high frequency transmission signal of a carrier frequency band. The frequency converter 13 outputs the generated high frequency transmission signal to the amplifier 14.

The amplifier 14 receives an input of the output high frequency transmission signal, amplifies the level of the received high frequency transmission signal into a predetermined level, and outputs the result to the first transmission antenna ANTs1. The amplified high frequency transmission signal is transmitted to be radiated in a space through the first transmission antenna ANTs1.

The transmission antenna ANTs1 transmits the high frequency transmission signal output from the RF transmitter 12 to be radiated in a space. As shown in FIG. 2(*a*), the high frequency transmission signal is transmitted during the transmission section Tw of the transmission cycle Tr, and is not transmitted during the non-transmission section (Tr−Tw).

The signal obtained by multiplying the reference signal generated by the reference signal oscillator Lo by the predetermined multiple is commonly supplied to local oscillators that are respectively provided in the RF transmitters 12 and 12*a* and the RF receivers 15 and 15*a* of the respective sector radars. Thus, it is possible to obtain synchronization between the local oscillators of the RF transmitters 12 and 12*a* and the RF receivers 15 and 15*a* of the respective sector radars.

Further, a transmission signal is generated on the basis of the signal obtained by multiplying the reference signal generated by the common reference signal oscillator Lo by the predetermined multiple, between the sector radars. Thus, the transmission cycles are synchronized between the respective sector radars.

Figure 3:
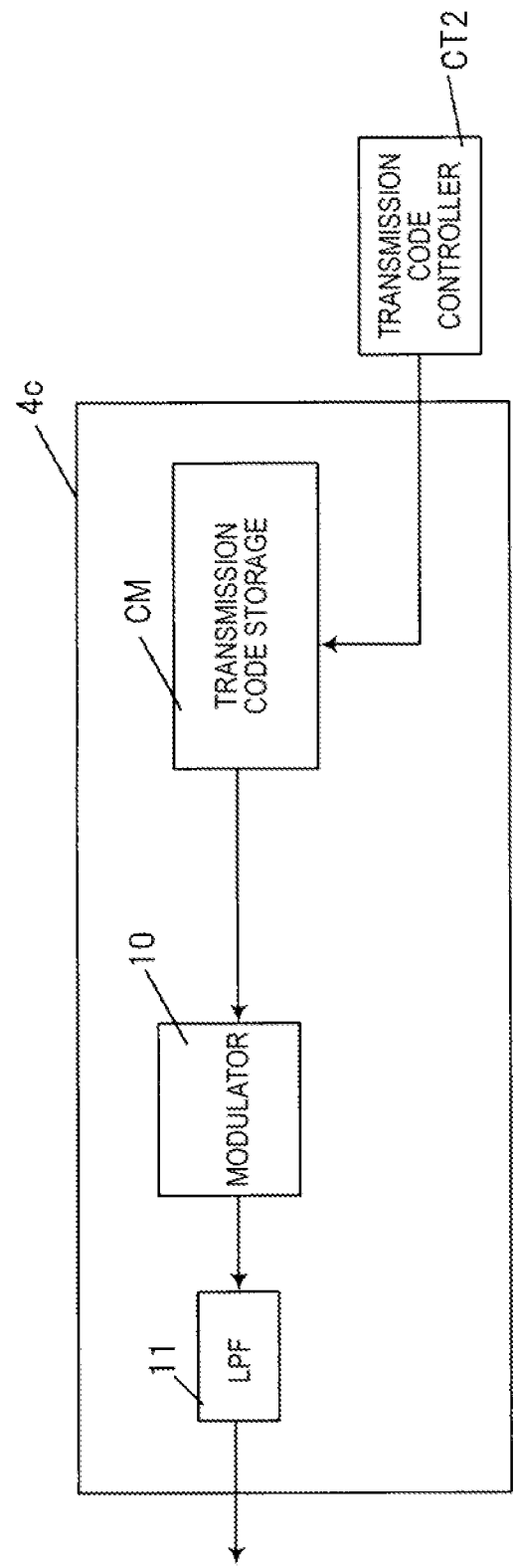
FIG. 3 is a block diagram illustrating another internal configuration of a transmission signal generator in the wide area radar device according to the first embodiment.

As shown in FIG. 3, a transmission code storage CM that stores in advance the respective transmission codes $a_n$, $b_n$, $-a_n$ and $-b_n$ generated by the transmission signal generator 4 may be provided in the first radar transmitter 2. This is similarly applied to the second sector radar transmitter 2*a*. The transmission code storage CM shown in FIG. 3 is not limitedly applied to the first embodiment, and may be similarly applied to the following respective embodiments. FIG. 3 is a block diagram illustrating another internal configuration of the transmission signal generator 4 in the wide area radar device 1 according to the first embodiment. A transmission signal generator 4*c* includes the transmission code storage CM, a transmission code controller CT2, the modulator 10, and the LPF 11.

In FIG. 3, the transmission code controller CT2 cyclically reads a transmission code generated according to each transmission cycle Tr from the M-th order to the (M+3)-th order from the transmission code storage CM, and outputs the read transmission code to the modulator 10.

Specifically, the transmission code controller CT2 reads the transmission code $a_n$ that is multiplied in advance by an orthogonal signal from the transmission code storage CM, and outputs the read transmission code $a_n$ to the modulator 10, at the M-th transmission cycle Tr. The transmission code controller CT2 reads the transmission code $b_n$ that is multiplied in advance by an orthogonal signal from the transmission code storage CM, and outputs the read transmission code $b_n$ to the modulator 10, at the (M+1)-th transmission cycle Tr.

The transmission code controller CT2 reads the transmission code $a_n$ that is multiplied in advance by the orthogonal signal from the transmission code storage CM, and outputs the read transmission code $a_n$ to the modulator 10, at the (M+2)-th transmission cycle Tr. The transmission code controller CT2 reads the transmission code $b_n$ that is multiplied in advance by the orthogonal signal from the transmission code storage CM, and outputs the read transmission code $b_n$ to the modulator 10, at the (M+3)-th transmission cycle Tr.

Since operations after output to the modulator 10 are the same as the above-described operations of the modulator 10 and the LPF 11, description about the same contents will be described.

Further, in a case where a transmission signal generator 4a of the second sector radar transmitter 2a is the transmitting signal generator 4c shown in FIG. 3, since the same operations are performed except that the respective transmission codes shown in FIG. 2(b) are stored, description about the operations will be omitted.

Next, the first sector radar receiver 3 and the second sector radar receiver 3a will be described. The first sector radar receiver 3 and the second sector radar receiver 3a have the same configuration, and are thus operated in the same way. Here, operations of a first separation code generator 22 and a first sub separation code generator 24 of the first sector radar receiver 3 to be described later are different from those of a second separation code generator 22a and a second sub separation code generator 24a of the second sector radar receiver 3.

Hereinafter, the operations of the first separation code generator 22 of the first sector radar receiver 3 and the second separation code generator 22a of the second sector radar receiver 3 will be described with respect to an example in which different operating portions in the first sector radar and the second sector radar are combined, when an expression of a u-th sector radar is used (u=1, 2), in the description of the operation of the first separation code generator 22.

Similarly, the operations of the first sub separation code generator 24 of the first sector radar receiver 3 and the second sub separation code generator 24a of the second sector radar receiver 3 will be described with respect to an example in which the different operating portions in the first sector radar and the second sector radar are combined, when an expression of a u-th sector radar is used (u=1, 2), in the description of the operation of the first sub separation code generator 24.

The first sector radar receiver 3 will be described. The first sector radar receiver 3 includes the first reception antenna ANTr1, the RF receiver 15 and a signal processor 19. The RF receiver 15 includes an amplifier 16, a frequency converter 17, and a quadrature detector 18. The signal processor 19 includes MD converters 20 and 21, the first separation code generator 22, a first correlation value calculator 23, the first sub separation code generator 24, a second correlation value calculator 25, a first separation code multiplication processor 26, a first addition processor 27, a second addition processor 28, a match determiner 29, and an incoming distance estimator 30. The first sector radar receiver 3 periodically calculates four transmission cycles (4Tr) as a signal processing section in the signal processor 19.

The second sector radar receiver 3a will be described. The second sector radar receiver 3a has an internal configuration although not shown in FIG. 1, and includes the second reception antenna ANTr2, the RF receiver 15a and a signal processor 19a, in a similar way to the first sector radar receiver 3. The RF receiver 15a includes an amplifier 16a, a frequency converter 17a, and a quadrature detector 18a. The signal processor 19a includes A/D converters 20a and 21a, a second separation code generator 22a, a third correlation value calculator 23a, a second sub separation code generator 24a, a fourth correlation value calculator 25a, a second separation code multiplication processor 26a, a third addition processor 27a, a fourth addition processor 28a, a match determiner 29a, and an incoming distance estimator 30a. The second sector radar receiver 3a periodically calculates four transmission cycles (4Tr) as a signal processing section in the signal processor 19a.

The first reception antenna ANTr1 receives a signal of a reflected wave obtained as a high frequency transmission signal transmitted by the first sector radar transmitter 2 is reflected by a target, and a noise signal around the wide area radar device 1, as a reception signal. Further, in a case where a measurement area of the first sector radar and a measurement area of the second sector radar are close to each other, the first reception antenna ANTr1 may receive the reflected wave obtained as a high frequency transmission signal transmitted by the second sector radar transmitter 2 is reflected by a target, as an interference signal. The signals of two reflected waves are signals of a high frequency band. The reception signal received by the first reception antenna ANTr1 is input to the RF receiver 15.

In the wide area radar device 1, the first sector radar receiver 3 holds one first reception antenna ANTr1. Similarly, the second sector radar receiver 3a holds one second reception antenna ANTr2.

The first reception antenna ANTr1 receives the above-mentioned reception signal at a section corresponding to each transmission cycle Tr shown in FIG. 2(a). Accordingly, the section Tr when the reception signal is received becomes a measurement section in the wide area radar device 1. This is similarly applied to the second reception antenna ANTr2.

The RF receiver 15 generates, on the basis of the reference signal generated by the reference signal oscillator Lo, a signal obtained by multiplying the reference signal by a predetermined multiple, in a similar way to the RF transmitter 12. The RF receiver 15 is operated on the basis of the generated signal. Thus, it is possible to obtain synchronization between the local oscillator of the RF transmitter 12 and the local oscillator (not shown) of the RE receiver 15.

The amplifier 16 receives an input of the reception signal of the high frequency band received by the first reception antenna ANTr1, amplifies the level of the input reception signal of the high frequency band, and outputs the result to the frequency converter 17.

The frequency converter 17 receives an input of the reception signal of the high frequency band output from the amplifier 16, down-converts the input reception signal of the high frequency band, and outputs the down-converted reception signal to the quadrature detector 18.

The quadrature detector 18 quadrature-detects the base band reception signal output from the frequency converter 17, to generate a baseband reception signal configured by an in-phase signal and a quadrature signal. The quadrature detector 18 outputs an in-phase signal component among the generated reception signal to the A/D converter 20, and outputs a quadrature signal component among the generated reception signal to the A/D converter 21.

The A/D converter 20 performs sampling the at discrete time k for the baseband in-phase signal output from the quadrature detector 18, and converts the in-phase signal of analogue data into digital data. The A/D converter 20 respectively outputs the converted in-phase signal of the digital data to the first correlation value calculator 23 and the second correlation value calculator 25.

Similarly, the A/D converter 21 performs sampling at the discrete time k for the baseband quadrature signal output from the quadrature detector 18, and converts the quadrature signal of analogue data into digital data. The A/D converter 21 respectively outputs the converted quadrature signal of the digital data to the first correlation value calculator 23 and the second correlation value calculator 25.

Further, the reception signal at the discrete time k of the M-th transmission cycle Tr converted by the A/D converters 20 and 21 is expressed as a complex signal x(k, M) in Formula (9), using an in-phase signal I(k, M) of the reception signal and a quadrature signal Q(k, M) of the reception signal.

[Exp. 9]

$$x(k,M)=I(k,M)+jQ(k,M) \tag{9}$$

As shown in FIG. 2(c), a discrete time k=1 represents a starting point of each transmission cycle Tr. Further, a discrete time k=Nr represents an ending time of a transmission section Tw of the transmission cycle Tr. Further, a discrete time k=(Nr+Nu) represents a time immediately before the ending at each transmission cycle Tr. In FIG. 2(c), for ease of description of the range of the discrete time k, only the M-th transmission cycle is shown as the range of the discrete time k.

The first separation code generator 22 receives an input of the orthogonal code OC (1) generated by the orthogonal code generator 8 at the M-th transmission cycle Tr, at each transmission cycle Tr. The first separation code generator 22 performs allocation for the received orthogonal code OC (1) as a first separation code.

The orthogonal code OC (1) is used for separation of the transmission signal transmitted by the first sector radar transmitter 2 from the reception signal received by the first sector radar receiver 3.

The first separation code generator 22 outputs the allocated orthogonal code DC (1) to the first separation code multiplication processor 26 to be synchronized with the transmission cycle Tr.

Specifically, the first separation code generator 22 outputs the orthogonal code OC (1, 1) to the first separation code multiplication processor 26 as the first separation code at the M-th transmission cycle Tr. Similarly, the first separation code generator 22 outputs the orthogonal code DC (2, 1) to the first separation code multiplication processor 26 as the first separation code at the (M+1)-th transmission cycle Tr. The first separation code generator 22 outputs the orthogonal code OC (3, 1) to the first separation code multiplication processor 26 as the first separation code at the (M+2)-th transmission cycle Tr. The first separation code generator 22 outputs the orthogonal code OC (4, 1) to the first separation code multiplication processor 26 as the first separation code at the (M+3)-th transmission cycle Tr.

This is expressed as follows, including the (M+4)-th transmission cycle Tr and thereafter. That is, at the (M+p)-th transmission cycle Tr of the u-th sector radar, the first separation code generator 22 outputs the orthogonal code OC (u) generated by the orthogonal code generator 8 to the first separation code multiplication processor 26 as the first separation code OC (mod(p, 4)+1, u).

Here, a parameter p represents an integer, and this is similarly applied to the following description. Further, mod(x, y) is a modulus operator that calculates a modulus obtained as x is divided by y.

The first correlation value calculator 23 receives an input of each complex signal x(k, M+p) of digital data output from the A/D converters 20 and 21. The first correlation value calculator 23 is synchronized with the operation of the transmission signal generator 4, to generate, on the basis of the reference signal generated in the reference signal oscillator Lo, a signal obtained by multiplying the reference signal by a predetermined multiple, in a similar way to the transmission signal generator 4.

In FIG. 1, an input of the reference signal to the first correlation value calculator 23 is omitted.

The first correlation value calculator 23 periodically generates a reference transmission signal r(k, M+p) of the same baseband as the transmission signal (see Formula (6)) generated by the transmission signal generator 4 according to the discrete time k, on the basis of the generated signal.

Further, the first correlation value calculator 23 calculates a first correlation value between the received complex signal x(k, M+p) and the generated reference transmission signal r(k, M+p). Here, in the calculation of the first correlation value, a complex conjugate value of the reference transmission signal r(k, M+p) is used.

Specifically, the first correlation value calculator 23 calculates a first correlation value $AC_1$(k, M+p) according to Formula (10), in a case where each transmission cycle Tr shown in FIG. 2, that is, the discrete time k is 1 to (Nr+Nu). The first correlation value calculator 23 outputs the first correlation value $AC_1$(k, M+p) calculated according to Formula (10) to the first separation code multiplication processor 26.

[Exp. 10]

$$AC_1(k, M+p) = \sum_{s=1}^{Nr} x(k+s-1, M+p)r^*(s, M+p) \tag{10}$$

The first separation code multiplication processor 26 multiplies a first separation code OC (mod(p,4)+1, u) generated by the first separation code generator 22 and the first correlation value $AC_1$(k, M+p) calculated by the first correlation value calculator 23. The first separation code multiplication processor 26 outputs the calculation result to the first addition processor 27. Here, the calculation result is the first correlation value multiplied by the first separation code generated by the first separation code generator 26. Hereinafter, the first correlation value multiplied by the first separation code is simply referred to as a "first multiplied correlation value".

The first addition processor 27 receives an input of the first multiplied correlation value output from the first separation code multiplication processor 26. The first addition processor 27 performs addition using the respective first multiplied correlation values passed through multiplication at four transmission cycles (4Tr) from the (M+v)-th order to the (M+v+3)-th order as a unit. A parameter v is a multiple of 4 including 0.

That is, the first addition processor 27 calculates a first average correlation value $aveAC_1$ (k, u) shown in Formula (11) according to a timing of the discrete time k, in the unit of the first multiplied correlation values at four transmission cycles. The first addition processor 27 outputs the calculated first average correlation value $aveAC_1$ (k, u) to the match determiner 29.

[Exp. 11]

$$aveAC_1(k, u) = \sum_{p=w}^{w+3} OC(\mathrm{mod}(p, 4)+1, u)AC_1(k, M+p) \tag{11}$$

By the operation of the first addition processor 27, in a case where the movement speed of the target is low, the wide area radar device 1 receives a high frequency transmission signal from the first sector radar, and suppresses a high frequency transmission signal from the other second sector radar. Here, in a case where the movement speed of the target is high, the wide area radar device 1 allows a high frequency transmission signal component from the other sector radar to remain.

Further, the addition may be performed, using the first average correlation value aveAC$_1$ (k, u) calculated at four transmission cycles (4Tr) as one unit, over the transmission cycles Tr corresponding to plural multiples of the unit. Thus, the wide area radar device 1 further suppresses a noise component, thereby making it possible to improve an SNR (Signal Noise Ratio) and to improve measurement performance relating to estimation of the incoming distance of the target.

Here, in the orthogonal code OC (1) of the code length P=4 at the M-th transmission cycle Tr, a first half orthogonal code OCa (1) and a second half orthogonal code OCb (1) have the same code (see Formula (7)). On the other hand, in the orthogonal code OC (2) of the code length P=4 at the (M+1)-th transmission cycle Tr, a first half orthogonal code OCa (2) and a second half orthogonal code OCb (2) have reversed code polarities (see Formula (9)).

For example, a case where the first sector radar receives an interference signal from the other second sector radar transmitter 2a is assumed. In this case, according to the relationship between the orthogonal code OC (1) and the orthogonal code OC (2), in a case where it is considered that fluctuation of the reception signal is static at four transmission cycles (4Tr) from the above-mentioned first average correlation value, the wide area radar device 1 may suppress the interference signal component, and may extract a desired transmission signal transmitted from the first sector radar transmitter 2.

Further, the first sector radar transmits a high frequency transmission signal generated on the basis of a transmission code a$_n$ at the M-th transmission cycle Tr, and transmits a high frequency transmission signal generated on the basis of a transmission code b$_n$ at the subsequent (M+1)-th transmission cycle Tr.

On the other hand, the second sector radar transmits a high frequency transmission signal generated on the basis of a transmission code b$_n$ at the M-th transmission cycle Tr, and transmits a high frequency transmission signal generated on the basis of a transmission code –a$_n$ at the subsequent (M+1)-th transmission cycle Tr.

Since the first sector radar and the second sector radar synchronously perform the transmission of the respective high frequency transmission signals, the wide area radar device 1 may suppress the interference signal component from the other first sector radar or second sector radar even at two transmission cycles (2Tr).

The reason is as follows. Interference between codes between the respective sector radars has the relationship proportional to a cross-correlation value of the transmission code. Thus, in a case where a cross-correlation value between different transmission codes (a$_n$, b$_n$) is obtained as z(k) at the M-th transmission cycle Tr, and in a case where it is considered that fluctuation of the reception signal is static over two transmission cycles (2Tr), the cross-correlation value between different transmission codes (a$_n$, b$_n$) at the (M+1)-th transmission cycle Tr is obtained as –z(k).

More specifically, a case where complex signals x(k, M+u) and x(k, M+u+1) of digital data that are respectively output from the A/D converters 20 and 21, included in the first correlation value calculator 23 in the first sector radar respectively include interference signal components v(k, M+u) and v(k, M+u+1) from the second sector radar will be described. Here, a parameter u is a multiple of 2 including 0.

The first correlation value calculator 23 calculates a first correlation value AC$_{12}$(k, M+u) that is a correlation operation with a reference transmission signal r$_1$(k, M+u) in the first sector radar using a transmission code an, with respect to an interference signal component v(k, M+u) from the second sector radar included in the input complex signal x(k, M+u), at an (M+u)-th transmission cycle Tr.

Here, at the second row in Formula (12), the interference signal component v(k, M+u) from the second sector radar performs formula modification using characteristics capable of being calculated by a convolution operation of a transmission signal r$_2$(k, M+u) using a transmission code bn and a complex delay profile h$_{12}$(k, M+u) indicating a complex propagation response of an interference signal component to the first sector radar from the second sector radar at the M-th transmission cycle Tr.

[Exp. 12]

$$AC_{12}(k, M+u) = \sum_{s=1}^{Nr} v(k+s-1, M+u)r_1^*(s, M+u) = \sum_{s=1}^{Nr}\left[\sum_{j=1}^{Nr} h_{12}(k+s-1-j, M+u)r_2(j, M+u)\right]r_1^*(s, M+u) \quad (12)$$

Further, the first correlation value calculator 23 calculates a first correlation value AC$_{12}$(k, M+u+1) that is a correlation operation with a reference transmission signal r$_1$(k, M+u+1) in the first sector radar using a transmission code bn with respect to the interference signal component v(k, M+u+1) from the second sector radar included in the input complex signal x(k, M+u+1), at an (M+u+1)-th transmission cycle Tr.

Here, the interference signal component v(k, M+u+1) from the second sector radar performs formula modification as expressed by Formula (13), using characteristics capable of being calculated by a convolution operation of a transmission signal r$_2$(k, M+u+1) using a reversed polarity of the transmission code a$_n$ and a complex delay profile h$_{12}$(k, M+u+1) indicating a complex propagation response of an interference signal component to the first sector radar from the second sector radar at the (M+u+1)-th transmission cycle Tr.

[Exp. 13]

$$AC_{12}(k, M+u+1) = \sum_{s=1}^{Nr} v(k+s-1, M+u+1)r_1^*(s, M+u+1) = \sum_{s=1}^{Nr}\left[\sum_{j=1}^{Nr} h_{12}(k+s-1-j, M+u+1)r_2(j, M+u+1)\right]r_1^*(s, M+u+1) \quad (13)$$

Here, the first sector radar and the second sector radar synchronizes the transmissions of the respective high frequency transmission signals at the (M+u)-th transmission cycle Tr and the (M+u+1)-th transmission cycle Tr. Thus, the relationship of r$_1$(k, M+u)=–r$_2$(k, M+u+1) and r$_1$(k, M+u+1)=r$_2$(k, M+u) is established between the respective transmission signals. The following formula is obtained by modifying Formula (13) using this relationship.

[Exp. 14]

$$AC_{12}(k, M+u+1) = \\ -\sum_{s=1}^{Nr}\left[\sum_{j=1}^{Nr}h_{12}(k+s-1-j, M+u+1)r_1(j, M+u)\right]r_2^*(s, M+u) \quad (14)$$

Here, the reference transmission signals $r_1(k, M\pm u)$ and $r_2(k, M+u+1)$ may set constellation (modulation symbol mapping) on a phase plane at each discrete time k to [0°, 180°] or [180°, 0°], in the modulator 10, with respect to a component of [1, −1] that is each element of the transmission codes $a_n$ and $b_n$.

In this case, the reference transmission signals $r_1(k, M+u)$ and $r_2(k, M+u+1)$ at each discrete time k may be considered as a real number, and thus, Formula (12) and Formula (14) may be modified like Formula (15) and Formula (16), respectively.

[Exp. 15]

$$AC_{12}(k, M+u) = \\ \sum_{s=1}^{Nr}\left[\sum_{j=1}^{Nr}h_{12}(k+s-1-j, M+u)r_2(j, M+u)\right]r_1(s, M+u) \quad (15)$$

[Exp. 16]

$$AC_{12}(k, M+u+1) = \\ -\sum_{s=1}^{Nr}\left[\sum_{j=1}^{Nr}h_{12}(k+s-1-j, M+u+1)r_1(j, M+u)\right]r_2(s, M+u) \quad (16)$$

Further, in a case where the complex delay profile $h_{12}(k, M)$ of the interference signal component to the first sector radar from the second sector at the (M+u)-th transmission cycle Tr and the complex delay profile $h_{12}(k, M+u+1)$ of the interference signal component to the first sector radar from the second sector at the (M+u+1)-th transmission cycle Tr are approximately the same (that is, in a case where it is considered that propagation path fluctuation is approximately static), the first correlation values $AC_{12}(k, M+u)$ and $AC_{12}(k, M+u+1)$ that correspond to the correlation operation result for the interference signal component from other sector radar are expressed by Formula (17).

[Exp. 17]

$$AC_{12}(k, M+u+1) \cong \\ -\sum_{s=1}^{Nr}\left[\sum_{j=1}^{Nr}h_{12}(k+s-1-j, M+u)r_1(j, M+u)\right] \quad (17) \\ r_2(s, M+u) = -AC_{12}(k, M+u)$$

From this relationship of the correlation operation result, the first addition processor 27 receives an input of the first multiplied correlation value output from the first separation code multiplication processor 26, and performs addition using the respective first multiplied correlation values passed through multiplication at two transmission cycles (2Tr) from the (M+u)-th order to the (M+u+1)-th order as a unit. Thus, the first addition processor 27 may suppress the interference components $AC_{12}(k, M+u)$ and $AC_{12}(k, M+u+1)$ from the second sector radar to the first sector radar.

Hereinbefore, in a case where the complex signals x(k, M+u) and x(k, M+u+1) of the digital data respectively output from the A/D converters 20 and 21 in the first correlation value calculator 23 respectively include the interference signal components v(k, M+u) and v(k, M+u+1) from the second sector, the interference suppression operation in the first sector radar has been described. Similarly, in the second sector radar, it is possible to suppress the interference signal component from the first sector radar, through the same operations of the first correlation value calculator 23a, the first separation code multiplication processor 26a, and the first addition processor 27a.

The first sub separation code generator 24 receives an input of an orthogonal code OC (mod(p, 4)+1, u) generated by the orthogonal code generator 8 at each transmission cycle Tr, at the (M+p)-th transmission cycle Tr in the u-th sector radar.

Further, the first sub separation code generator 24 receives an input of the type ($a_n$ or $b_n$) of the transmission signal output from the transmission code switch 7 according to the code switching control signal from the transmission code controller CT1 at each transmission cycle Tr, at the (M+p)-th transmission cycle Tr in the u-th sector radar.

The first sub separation code generator 24 generates a first sub separation code subOC (u) according to the type of the input orthogonal code OC (mod(p, 4)+1, u) and the transmission code. The first sub separation code subOC (u) is used for separating the transmission signal transmitted by the first sector radar transmitter 2 from the reception signal received in the first sector radar receiver 3 in the unit of sub codes having a code length L/2.

The first sub separation code generator 24 outputs the generated first sub separation code subOC (u) to the second correlation value calculator 25.

Here, the u-th sub separation code subOC (u) is generated by using characteristics obtained as the complementary codes $a_n$ and $b_n$ having a code length L are combined with $c_n$ and $d_n$ that form a pair of complementary codes having a code length L/2 as shown in Formula (18). The $c_n$, and $d_n$ that form the pair of complementary codes having the code length L/2 are expressed as shown in Formula (19). This is similarly applied to the following embodiments.

[Exp. 18]

$$a_n = [a_1, a_2, \ldots, a_{L/2}, a_{(L/2)+1}, \ldots, a_L] \\ = [c_1, c_2, \ldots, c_{L/2}, d_1, d_2, \ldots, d_{L/2}] \quad (18)$$

$$b_n = [b_1, b_2, \ldots, b_{L/2}, b_{(L/2)+1}, \ldots, b_L] \\ = [c_1, c_2, \ldots, c_{L/2}, -d_1, -d_2, \ldots, -d_{L/2}]$$

[Exp. 19]

$$c_n = [c_1, c_2, \ldots, c_{L/2}] \quad (19) \\ d_n = [d_1, d_2, \ldots, d_{L/2}]$$

A method of generating a first sub separation code will be specifically described using the relationships shown in Formulas (18) and (19). As shown in FIG. 2(a), when a high frequency transmission signal is transmitted at each transmission cycle Tr from the M-th order to the (M+3)-th order, an orthogonal code OC (M, 1) is multiplied by a transmission code $a_n$ or a transmission code $b_n$. That is, the transmission codes $[a_n, b_n, a_n, b_n]$ corresponding to each transmission cycle Tr from the M-th order to the (M+3)-th order is multiplied by an orthogonal code OC (1)=[1, 1, 1, 1].

In a case where the transmission codes $[a_n, b_n, a_n, b_n]$ of the multiplication result are replaced by sub-codes $c_n$ and $d_n$ having a code length 112, the result becomes $[c_n, d_n, c_n, -d_n, c_n, d_n, c_n, -d_n]$. The first sub separation code generator 24 generates coefficients of the respective transmission codes in a case where the transmission codes $[a_n, b_n, a_n, b_n]$ are replaced by the sub codes $c_n$ and $d_n$ having the code length L/2, as the first sub separation code subOC (1). That is, the first sub separation code generator 24 generates the coefficients [1, 1, 1, −1, 1, 1, 1, −1] as a first sub separation code subOC (1).

Further, in a similar way to the first sub separation code generator 24 of the first sector radar, in the second sector radar, the second sub separation code generator 24a generates a second sub separation code subOC (2). Specifically, as shown in FIG. 2(b), when the high frequency transmission signal is transmitted at each transmission cycle Tr from the M-th order to the (M+3)-th order, using the relationships shown in Formula (18) and Formula (19), an orthogonal code OC (M, 2) is multiplied by the transmission code $a_n$ or the transmission code $b_n$. That is, the transmission codes $[b_n, a_n, b_n, a_n]$ corresponding to each transmission cycle Tr from the M-th order to the (M+3)-th order is multiplied by an orthogonal code OC (2)=[1, −1, −1, 1].

In a case where the transmission codes $[b_n, -a_n, -b_n, a_n]$ of the multiplication result are replaced by the sub-codes $c_n$ and $d_n$ having the code length L/2, the result becomes $[c_n, -d_n, -d_n, -c_n, d_n, c_n, d_n]$. The second sub separation code generator 24a generates coefficients of the respective transmission codes in a case where the transmission codes $[b_n, a_n, b_n, a_n]$ are replaced by the sub codes $c_n$ and $d_n$ having the code length L/2, as the second sub separation code subOC (2).

That is, the second sub separation code generator 24a generates the coefficients [1, −1, −1, −1, −1, 1, 1, 1] as the second sub separation code subOC (2). In the following description, an h-th element of the u-th sub separation code subOC (u) is expressed as subOC (h, u). Here, a parameter h is 1, 2, . . . , 8.

As described above, between the respective sector radars, the first sub separation code subOC (1)=[1, 1, 1, −1, 1, 1, 1, −1] and the second sub separation code subOC (2)=[1, −1, −1, −1, −1, 1, 1, 1] establishes the relationship shown in Formula (20). That is, the first sub separation code subOC (1) and the second sub separation code subOC (2) are orthogonal to each other in the unit of two elements of the respective sub separation codes (corresponding to one transmission cycle (1Tr)), in the unit of four elements thereof (corresponding to two transmission cycle (2Tr)), and in the unit of eight elements thereof (corresponding to four transmission cycles (4Tr)). Through the relationship shown in Formula (20), in a case where it is considered that fluctuation of the reception signals is static over one transmission cycle (Tr), the two transmission cycles (2Tr) and the four transmission cycles (4Tr), the wide area radar device 1 may suppress the interference signal component from the other sector radar.

[Exp. 20]

$$\sum_{h=2(i-1)+1}^{2i} subOC(h, 1)subOC(h+1, 2) = 0 (i = 1, 2, 3, 4)$$

$$\sum_{h=4(i-1)+1}^{4i} subOC(h, 1)subOC(h+1, 2) = 0 (i = 1, 2)$$

$$\sum_{h=1}^{R} subOC(h, 1)subOC(h+1, 2) = 0$$
(20)

The second correlation value calculator 25 receives inputs of the complex signals x(k, M+p) of the digital data respectively output from the A/D converters 20 and 21. The second correlation value calculator 25 is synchronized with the operation of the transmission signal generator 4, and generates, on the basis of the reference signal generated by the reference signal oscillator Lo, a signal obtained by multiplying the reference signal by a predetermined multiple, in a similar way to the transmission signal generator 4.

In FIG. 1, the input of the reference signal to the first correlation value calculator 23 and the second correlation value calculator 25 is omitted. The second correlation value calculator 25 periodically generates a reference transmission signal r(k, M+p) of the same baseband as the transmission signal (see Formula (6)) generated by the transmission signal generator 4 according to the discrete time k, on the basis of the signal generated by the multiplication by the predetermined multiple. The reference transmission signal r(k, M+p) is expressed as a complex signal in Formula (14) using an in-phase component I (k, M+p) of the reference transmission signal and an orthogonal component Q(k, M+p) of the reference transmission signal.

[Exp. 21]

$$r(k,M+p)=I(k,M+p)+jQ(k,M+p) \quad (21)$$

Further, the second correlation value calculator 25 calculates a second correlation value of the input complex signal x(k, M+p) and the generated reference transmission signal r(k, M+p) as follows. Specifically, when a transmission section Tw of each transmission cycle Tr is divided into the first half and the second half, the second correlation value calculator 25 calculates a first half second correlation value and a second half second correlation value as shown in Formula (22), respectively. Here, the first half represents the range of the discrete time k=1 to Nr/2. Further, the second half represents the range of the discrete time k=(Nr/2)+1 to Nr.

Then, the second correlation value calculator 25 multiplies the calculated first half second correlation value and the second sub separation code subOC (h, u). Similarly, the second correlation value calculator 25 multiplies the calculated second half second correlation value and the second sub separation code subOC (h, u).

Further, the second correlation value calculator 25 adds the first half second correlation value multiplied by each second sub separation code subOC (h, u) to the second half second correlation value to calculate the second correlation value (see Formula (23)). The second correlation value calculator 25 outputs the calculated second correlation value to the second addition processor 28. Here, AC2(k, M+p, u) represents the second correlation value that is an output of the second correlation value calculator 25 at the discrete time k in the u-th sector radar. An asterisk * represents a complex conjugate operator.

[Exp. 22]

$$AC_2sub_1(k, M+p) = \sum_{s=1}^{Nr/2} x(k+s-1, M+p)r^*(s, M+p) \quad (22)$$

$$AC_2sub_2(k, M+p) = \sum_{s=(Nr/2)+1}^{Nr} x\left(k+\frac{Nr}{2}s-1, M+p\right)r^*(s, M+p)$$

[Exp. 23]

$$AC_2(k, M+p, u) = subOC(\mathrm{mod}[2p+1, 2], u)AC_2sub_1(k, M+p) + \\ subOC(\mathrm{mod}[2(p+1)+1, 2], u)AS_2sub_2(k, M+p) \quad (23)$$

Here, a case where the signal from the second sector radar is overlapped with the reception signal received by the first sector radar as an interference signal (interference wave) is assumed. In this case, the second correlation value calculator 25 multiplies OC (a first half second correlation value $AC_2sub1$ (k, M+p) and a second half second correlation value $AC_2sub_2$ (k, M+p) at the discrete time k and the first sub separation code subOC (1) of the first sector radar. Thus, in a case where the movement distance of the target is short and the propagation environment is static, the wide area radar device 1 may suppress the interference signal component from the other second sector radar, as shown in Formula (24).

[Exp. 24]

$$\sum_{p=0}^{1} \{subOC(\mathrm{mod}[2p+1, 2], 1)AC_2sub_2(k, M+p) + \\ subOC(\mathrm{mod}[2(p+1), 2], 1)AC_2sub_1(k, M+p)\} = 0 \quad (24)$$

$$\sum_{n=2}^{3} \{subOC(\mathrm{mod}[2p+1, 2], 1)AC_2sub_1(k, M+p) + \\ subOC(\mathrm{mod}[2(p+1), 2], 1)AC_2sub_2(k, M+p)\} = 0$$

Similarly, a case where the signal from the first sector radar is overlapped with the reception signal received by the second sector radar as an interference signal (interference wave) is assumed. In this case, the fourth correlation value calculator 25a multiplies OC (a first half fourth correlation value $AC_2sub_1$ (k, M+p) and a second half fourth correlation value $AC_2sub_2$ (k, M+p) at the discrete time k and the second sub separation code subOC (2) of the second sector radar. Thus, in a case where the movement distance of the target is short and the propagation environment is static, the wide area radar device 1 may suppress the interference signal component from the other first sector radar, as shown in Formula (25).

[Exp. 25]

$$\sum_{p=0}^{1} \{subOC(\mathrm{mod}[2p+1, 2], 2)AC_2sub_1(k, M+p) + \\ subOC(\mathrm{mod}[2(p+1), 2], 2)AC_2sub_2(k, M+p)\} = 0 \quad (25)$$

$$\sum_{p=2}^{3} \{subOC(\mathrm{mod}[2p+1, 2], 2)AC_2sub_1(k, M+p) + \\ subOC(\mathrm{mod}[2(p+1), 2], 2)AC_2sub_2(k, M+p)\} = 0$$

As described above, the calculations of the first correlation value calculator 23 and the second correlation value calculator 25 are preformed with respect to the discrete time k=1 to (Nr+Nu), respectively. The measurement range (range of k) may be defined to be narrower like k=Nr to (Nr+Nu), for example, according to the presence range of the target that is a measurement target of the wide area radar device 1.

Thus, the wide area radar device 1 may reduce the amount of respective calculations of the first correlation value calculator 23 and the second correlation value calculator 25, respectively. That is, the wide area radar device 1 may reduce the amount of power consumption based on reduction in the amount of calculation of the signal processor 19.

The second addition processor 28 receives an input of the second correlation value output from the second correlation value calculator 25. The second addition processor 28 performs addition using the second correlation value at the two transmission cycles (2Tr) of the M-th order and the (M+1)-th order as a unit. That is, the second addition processor 28 calculates a second average correlation value aveAC$_2$ (k, u), as shown in Formula (26), according to a timing of the discrete time k, using the second correlation values $AC_2$(k, M+p, u) to $AC_2$(k, M+p+1, u) at two transmission cycles as a unit. The second addition processor 28 outputs the calculated second average correlation value aveAC$_2$ (k, u) to the match determiner 29.

[Exp. 26]

$$aveAC_2(k, u) = \sum_{s=p}^{p+1} AC_2(k, M+s, u) \quad (26)$$

According to the operation of the second addition processor 28, in a case where the movement speed of the target is high the wide area radar device 1 receives a high frequency transmission signal from the first sector radar, and suppresses a high frequency transmission signal from the other second sector radar.

Further, using the second average correlation value aveAC$_2$ (k, u) calculated at the two transmission cycles (2Tr) as a unit, the addition may be performed over the transmission cycles Tr of corresponding to plural multiples of the unit. Thus, the wide area radar device 1 further suppresses a noise component, thereby making it possible to improve an SNR and to improve measurement performance relating to estimation of the incoming distance of the target.

The match determiner 29 receives inputs of a first average correlation value aveAC$_1$ (k, u) output from the first addition processor 27 and a second average correlation value aveAC$_2$ (k, u) output from the second addition processor 28. The match determiner 29 extracts the discrete time k when a predetermined determination threshold value is B1 or more, that is, when the relationship shown in Formula (27) is satisfied, on the basis of the first average correlation value input over a predetermined number of transmission cycles Tr.

Further, the match determiner 29 extracts the discrete time k when a predetermined determination threshold value is B2 or more, that is, when the relationship shown in Formula (28) is satisfied, on the basis of the second average correlation value input over a predetermined number of transmission cycles Tr.

Further, the match determiner 29 compares the discrete time k when Formula (27) is satisfied with the discrete time k when Formula (28) is satisfied, and outputs the first average correlation value aveAC$_1$ (k, u) at the discrete time k when the both discrete times match with each other to the incoming distance estimator 30.

[Exp. 27]

$$|\text{aveAC}_1(k,u)| \geq B1 \quad (27)$$

[Exp. 28]

$$|\text{aveAC}_2(k,u)| \geq B2 \quad (28)$$

Here, the above-mentioned predetermined determination threshold values B1 and B2 are levels obtained by adding a predetermined margin (about 3 [dB] to about 10 [dB]) to noise levels of the outputs of the first addition processor 27 and the second addition processor 28.

The predetermined margin is set to the same value in the determination threshold value B1 and the determination threshold value B2, but it is preferable that the margin in the determination threshold value B2 be smaller. The reason why the margin in the determination threshold value B2 is smaller is because, since the output of the second addition processor 28 that is the correlation calculation result has a low SNR of the second average correlation value compared with the output of the first addition processor 27 due to the transmission code of the code length L/2, the signal level when the noise level is used as a reference is low.

Figure 4:
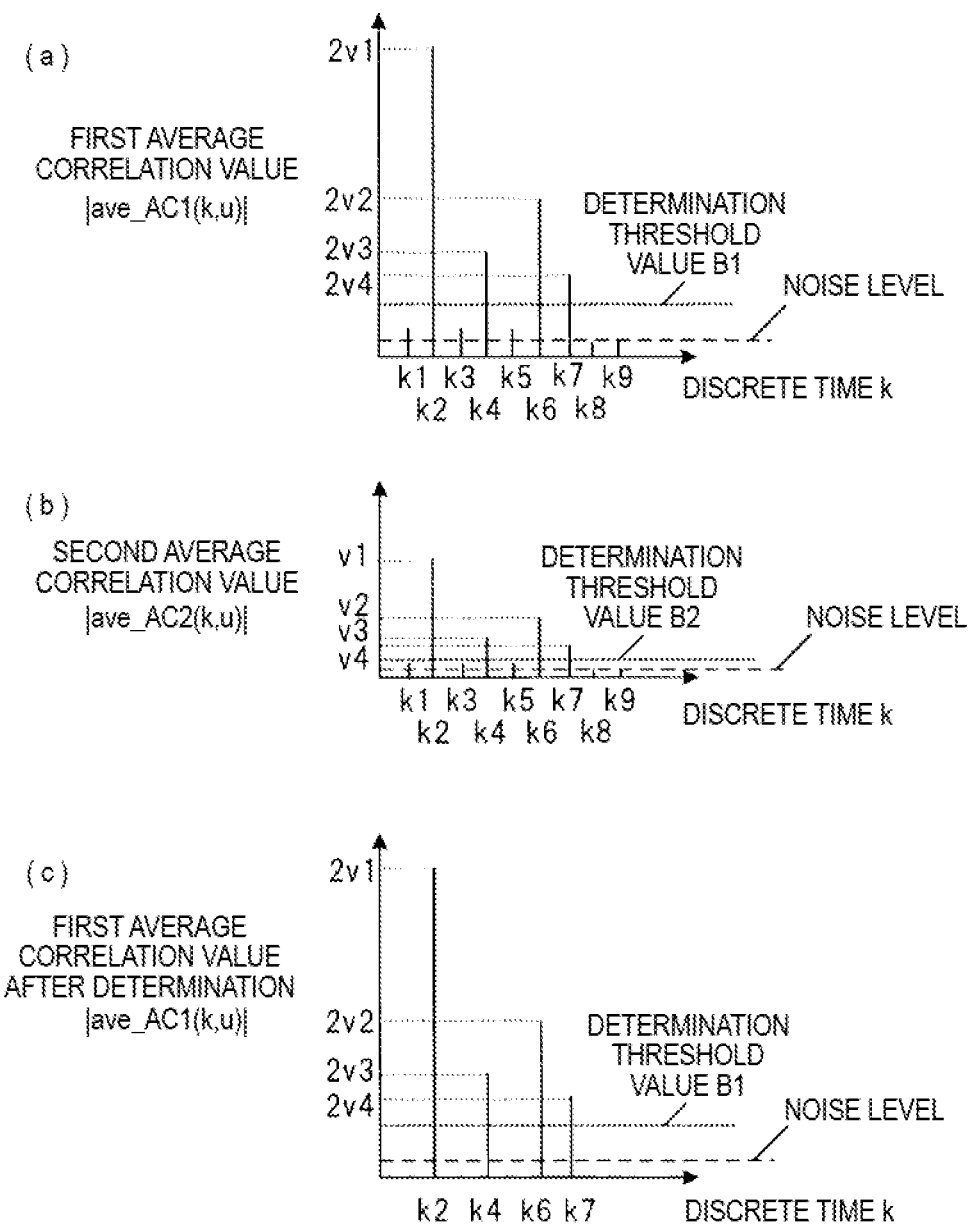
FIG. 4 is a diagram illustrating an operation of a match determiner in a case where a target is not moved, in which (a) is a graph illustrating the relationship between an absolute value of a first average correlation value and a discrete time, (b) is a graph illustrating the relationship between an absolute value of a second average correlation value and the discrete time, and (c) is a graph illustrating the relationship between the absolute value of the first average correlation value that is an output of the match determiner and the discrete time.

An operation of the match determiner 29 will be described in detail with reference to FIGS. 4 and 5. FIG. 4 is a diagram illustrating an operation of the match determiner 29 in a case where a target is not moved. (a) in FIG. 4 is a graph illustrating the relationship between an absolute value of a first average correlation value that is an output of the first addition processor 27 and a discrete time k. (b) in FIG. 4 is a graph illustrating the relationship between an absolute value of a second average correlation value that is an output of the second addition processor 28 and the discrete time k. (c) in FIG. 4 is a graph illustrating the relationship between the absolute value of the first average correlation value that is an output of the match determiner 29 and the discrete time k.

Figure 5:
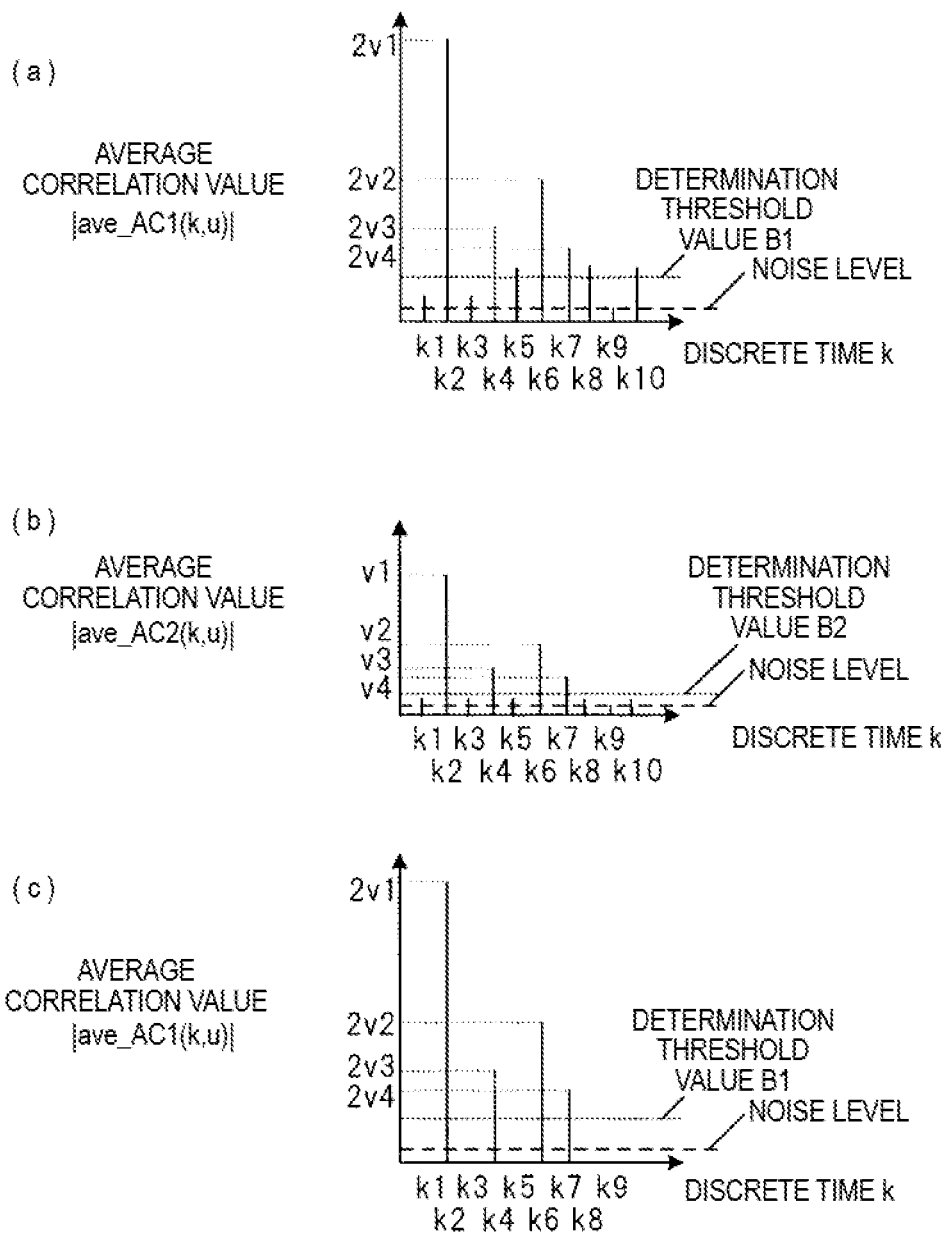
FIG. 5 is a diagram illustrating an operation of a match determiner in a case where a target moves, in which (a) is a graph illustrating the relationship between an absolute value of a first average correlation value and a discrete time, (b) is a graph illustrating the relationship between an absolute value of a second average correlation value and a discrete time, and (c) is a graph illustrating the relationship between the absolute value of the first average correlation value that is an output of the match determiner and the discrete time.

FIG. 5 is a diagram illustrating an operation of the match determiner 29 in a case where the target moves. (a) in FIG. 5 is a graph illustrating the relationship between an absolute value of a first average correlation value that is an output of the first addition processor 27 and the discrete time k. (b) in FIG. 5 is a graph illustrating the relationship between an absolute value of a second average correlation value that is an output of the second addition processor 28 and the discrete time k. (c) in FIG. 5 is a graph illustrating the relationship between the absolute value of the first average correlation value that is an output of the match determiner 29 and the discrete time k.

The match determiner 29 extracts a set group1 of the discrete time k of absolute values $|\text{aveAC}_1(k, u)|$ of the first average correlation values that exceed the determination threshold value B1. The match determiner 29 extracts a set group2 of the discrete time k of absolute values $|\text{aveAC}_2(k, u)|$ of the second average correlation values that exceed the determination threshold value B2.

For example, in (a) and (b) of FIG. 4, the set group1 is {k2, k4, k6, k7}, and the set group2 is {k2, k4, k6, k7}. The match determiner 29 extracts a matched set group3 of the discrete time k from among the respectively extracted set group1 and set group2. For example, as shown in FIG. 4(c), the set group3 is {k2, k4, k6, k7}.

The match determiner 29 outputs a first average correlation value $|\text{aveAC}_1(g, u)|$ to the incoming distance estimator 30 after determination of the extracted set group3 at each discrete time. Here, a parameter g represents an element of the discrete time k included in the set group3.

For example, FIG. 5 shows signals of waves reflected from the incoming target at a discrete time k2, that is, an absolute value $|\text{aveAC}_1(k, u)|$ that is the output of the first addition processor 27 and an absolute value $|\text{aveAC}_2(k, u)|$ that is the output of the second addition processor 28 in the first sector radar in a case where the target moves.

In this case, since the levels of the signals of the waves reflected from the incoming target at the discrete time k2 are strong, $\text{aveAC}_1$ (k5, u), $\text{aveAC}_1$ (k8, u) and $\text{aveAC}_1$ (k10, u) in addition to the first average correlation value $\text{aveAC}_1$ (k2, u) at the discrete time k2 are generated as a range sidelobe that exceeds the determination threshold value B1, due to the Doppler change associated with the movement of the target.

In this case, in a sidelobe of the absolute value $|\text{aveAC}_2$ (k, u)| of the output of the second addition processor 28, an addition time in the second addition processor 28 is shorter than the addition time in the first addition processor 27. Thus, it is possible to suppress increase in the range sidelobe in the absolute values $|\text{aveAC}_1$ (k5, u)|, $|\text{aveAC}_1$ (k8, u)| and $|\text{aveAC}_1(k10, u)|$ of the outputs of the first addition processor 27.

As a result, in a case where the absolute value $|\text{aveAC}_2(k, u)|$ of the output of the second addition processor 28 becomes a sidelobe level lower than the determination threshold value B2, the match determiner 29 extracts the set group1 and the set group2 of the discrete time of the absolute value $|\text{aveAC}_1(k, u)|$ of the first average correlation value that exceeds the determination threshold value B1 and the second average correlation value $|\text{aveAC}_2$ (k, u)| that exceeds the determination threshold value B2, as follows.

Specifically, the match determiner 29 extracts set group1={k2, k4, k5, k6, k7, k8, k10}, and set group2={k2, k4, k6, k7}, respectively, as shown in (a) and (b) of FIG. 5. The match determiner 29 extracts the matched set group3 of the discrete time k from among the respectively extracted set group1 and set group2, as shown in (c) of FIG. 5. That is, the set group3 is {k2, k4, k6, k7}.

The match determiner 29 outputs the first average correlation value $|\text{aveAC}_1(g, u)|$ to the incoming distance estimator 30 after determination of the extracted set group3 at each discrete time. Here, a parameter g is an element of the discrete time k included in the set group3. Thus, even in a case where the range sidelobe is increased as the target moves, the match determiner 29 may suppress the range sidelobe with respect to the signals of the reflected waves from the incoming target at the discrete time k2. Further, even in a case where the interference wave component from the other sector radar includes the Doppler change, it is possible to suppress the interference wave component according to the above-mentioned operation of the match determiner 29.

The incoming distance estimating part 30 receives an input of the first average correlation value $|\text{aveAC1}(g, u)|$ after determination output from the match determiner 29. The incoming distance estimating part 30 performs an estimation calculation of the distance to the target, on the basis of the received first average correlation value $|\text{aveAC1}(g, u)|$ after determination. The estimation calculation of the distance to the target in the incoming distance estimator 30 is a known technique, and may be realized by the following Reference NFL 1, for example.

(Reference NPL 1) J. J. BUSSGANG, et al., "A Unified Analysis of Range Performance of CW, Pulse, and Pulse Doppler Radar", Proceedings of the IRE, vol. 47, Issue 10, pp. 1753-1762 (1959).

For example, the incoming distance estimator 30 determines a time difference between a discrete time when the first average correlation value after determination is a maximum value and a transmission time of the high frequency transmission time, on the basis of the first average correlation value |aveAC1($g$, $u$)| after determination output from the match determiner 29. Further, the incoming distance estimator 30 estimates the distance to the target, on the basis of the determined time difference.

As described above, according to the radar device 1 of the first embodiment, as the plurality of sector radars transmits pulse compressed codes capable of reducing interference between the sector radars in the unit of sub code length, it is possible to maintain low range sidelobe characteristics in the signal of the wave reflected from the target even in a case where the target moves, and to suppress interference between the plurality of sector radars.

Here, in a case where a plurality of reception antennas is provided, each sector radar may use the plurality of reception antennas, and may estimate an incoming angle of the target on the basis of a reception phase difference of the target in reception signals obtained by the reception antennas.

Figure 6:
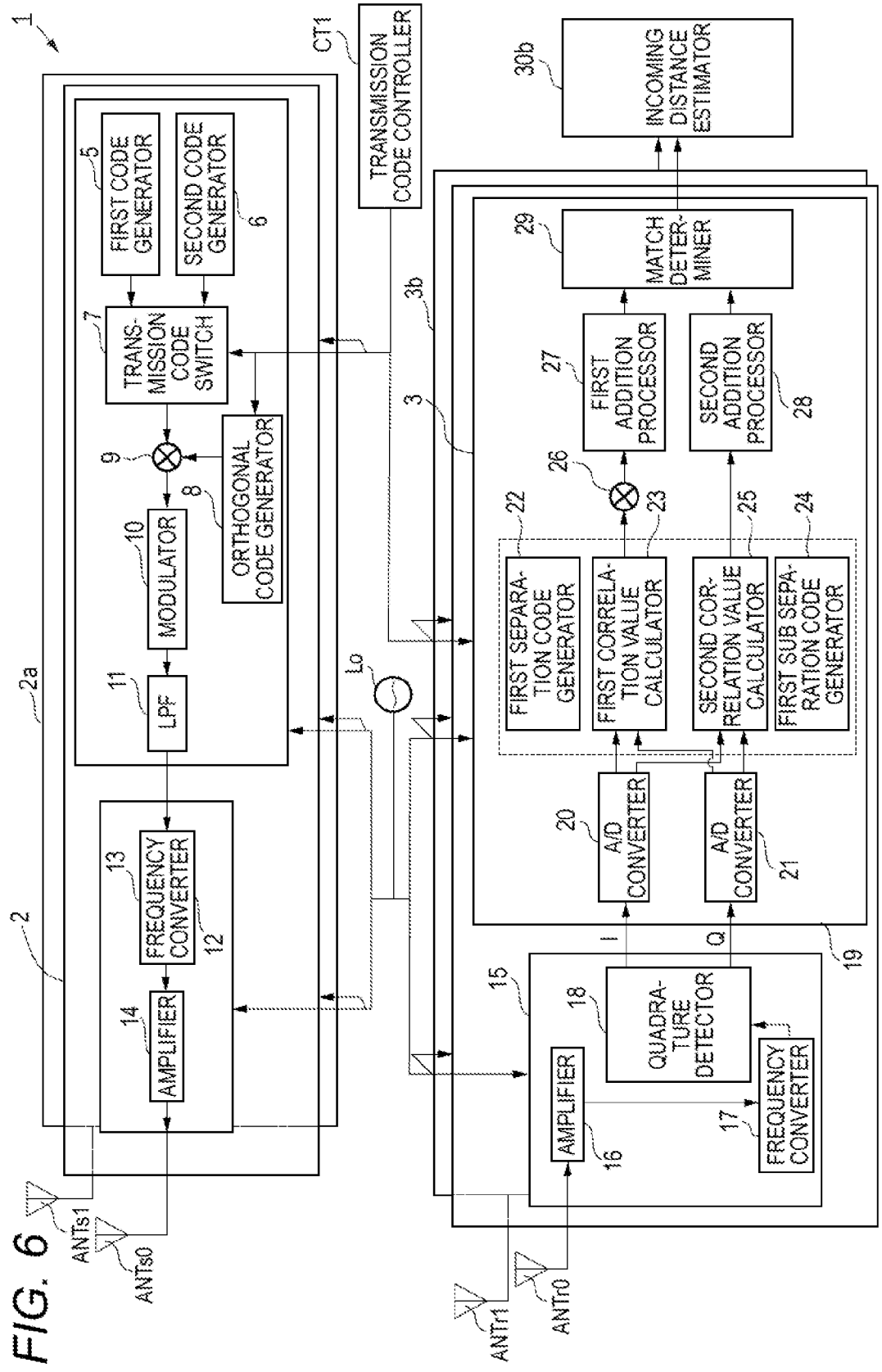
FIG. 6 is a block diagram illustrating another internal configuration of the wide area radar device according to the first embodiment.

Further, in a case where the respective sector radar have an overlapped measurement area, as shown in FIG. 6, it is possible to combine determination results of the match determiners of the respective sector radars to estimate the incoming distance to the target. FIG. 6 is a block diagram illustrating another internal configuration of the wide area radar device 1 according to the first embodiment.

Here, the combination of the determination results in the match determiner means that an incoming distance determiner 30$b$ further performs match determination using the determination result of the match determiner by means of a plurality of sector radar receivers. The plurality of sector radar receivers has an overlapped measurement area between the plurality of sector radars.

The incoming distance estimator 30$b$ estimates the incoming distance to the target on the basis of the match determination result. Thus, in addition to the effect of the wide area radar device 1 of the first embodiment, it is possible to simplify the configuration of the signal processor of each sector radar receiver.

Modification Example 1 of the First Embodiment

The complementary codes $a_n$ and $b_n$ having the code length L used in the first embodiment is obtained by recursive connection from sub codes that form a pair of complementary codes having a code length $L/2^w$. Thus, in a sub separation code subOC (q) generated according to code units $e_n$ and $f_n$ having a code length $L/2^w$, the orthogonal relationship is obtained. Here, w represents an integer of 1 or more.

Accordingly, the wide area radar device according to Modification Example 1 of the first embodiment may generate a sub separation code using the pair of sub codes e and $f_n$ having the code length $L/2^w$ that is a shorter code length, according to the movement speed of the target.

In this case, the second correlation value calculator of the wide area radar device performs a second correlation calculation in a unit obtained by dividing a portion corresponding to the transmission section Tw of the reference transmission signal r(k, M+p) by $2^w$ as a reference transmission signal.

The unit obtained by dividing the portion corresponding to the transmission section Tw of the reference transmission signal r(k, M+p) by $2^w$ is the range of an initial portion of the reference transmission signal r(k, M+p): discrete time k=1 to Nr/$2^w$, and the range of the next portion of the reference transmission signal r(k, M+p): discrete time k=(Nr/$2^w$)+1 to 2×Nr/$2^w$, and the range of the g-th portion of the reference transmission signal r(k, M+p): discrete time k=(g−1)×(Nr/$2^w$)+1 to g/Nr/$2^w$. Here, g is 1, ..., $2^w$.

Further, the second correlation value calculator performs the addition process after multiplying the calculated correlation value by the sub separation code subOC (u).

With such a configuration, even in a case where the movement speed of the target is relatively high, it is possible to shorten the addition process associated with the correlation process in the sub code unit of the code units $e_n$ and $f_n$ having a code length $L/2^w$. Thus, it is possible to reduce the phase change due to the Doppler change, and consequently, to obtain a correlation value in which increase in the sidelobe range of the complementary codes of the code units $e_n$ and $f_n$ having a code length $L/2^w$ is suppressed. Further, it is possible to further effectively perform the process of suppressing the sidelobe range in the match determiner.

Modification Example 2 of the First Embodiment

In the first embodiment, the wide area radar device 1 has the two sector configuration of the first sector radar and the second sector radar as shown in FIG. 1. A wide area radar device according to Modification Example 2 of the first embodiment further includes a third sector radar, and thus, has a configuration of total three sector radars.

Figure 7:
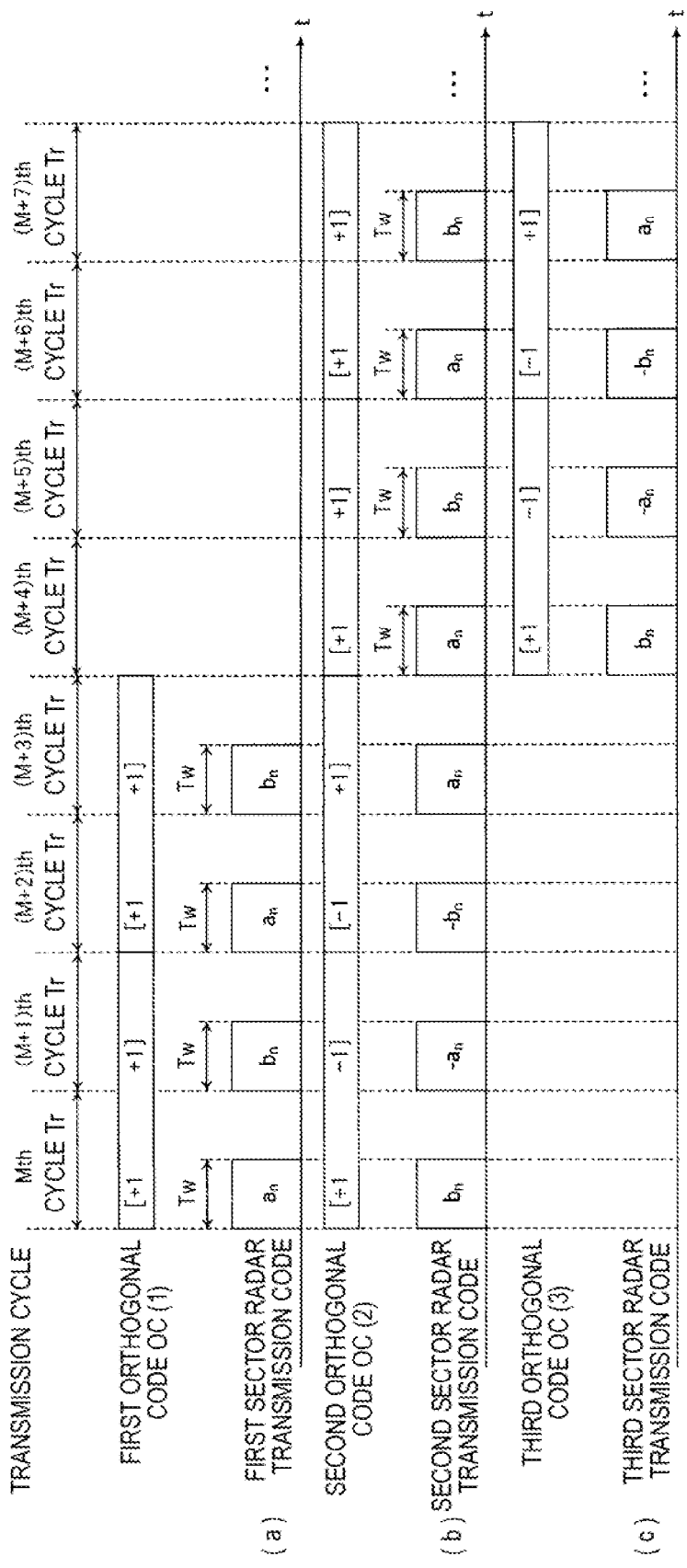
FIG. 7 is a timing chart relating to a part of an operation of a wide range radar device that includes three sector radars, in which (a) is a diagram illustrating an orthogonal code OC (1) and a transmission code of a first sector radar at each transmission cycle Tr, (b) is a diagram illustrating an orthogonal code OC (2) and a transmission code of a second sector radar at each transmission cycle Tr, and (c) is a diagram illustrating an orthogonal code OC (3) and a transmission code of a third sector radar at each transmission cycle Tr.
Figure 8:
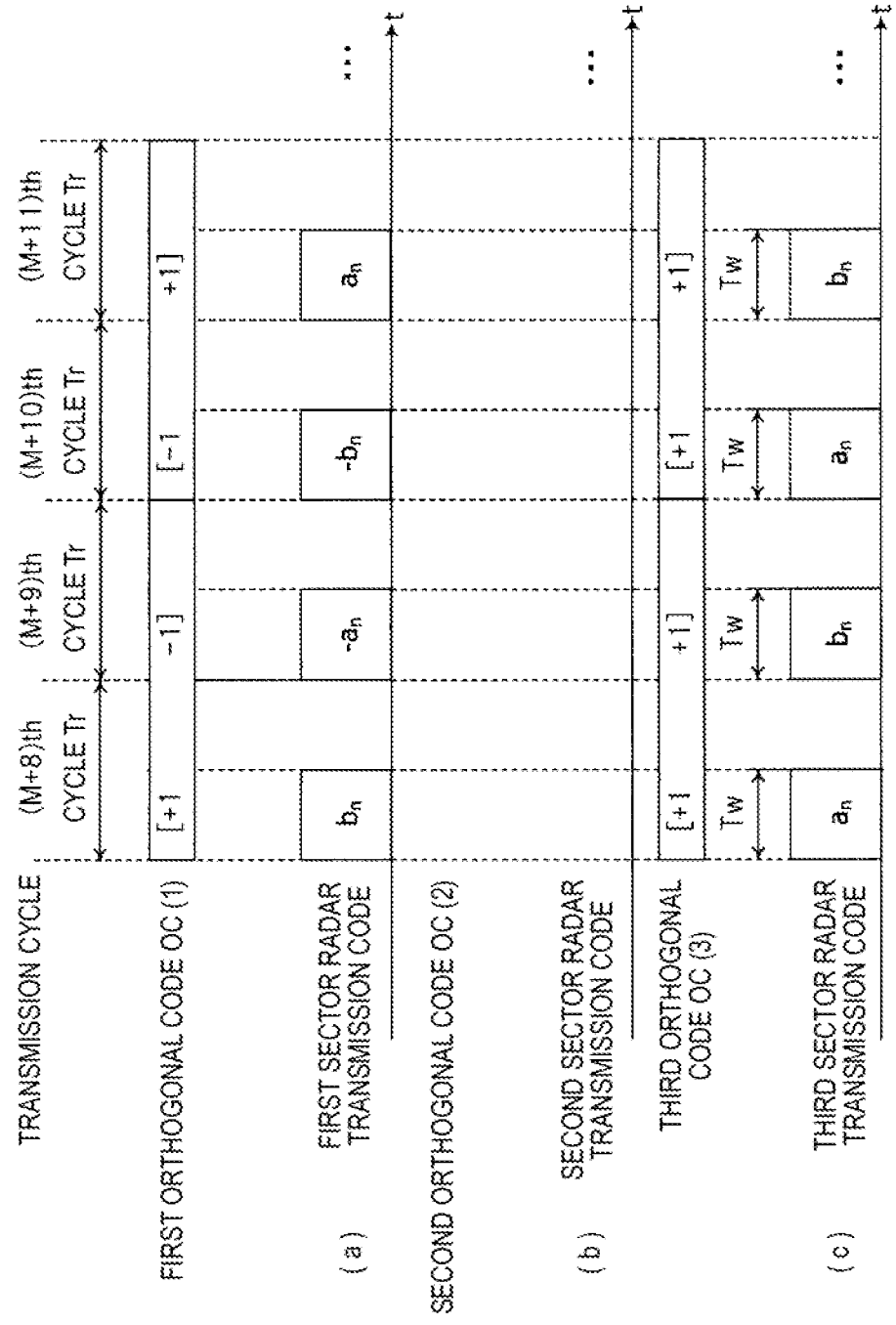
FIG. 8 is a timing chart relating to a part of an operation of a wide range radar device that includes three sector radars, in which (a) is a diagram illustrating an orthogonal code OC (1) and a transmission code of a first sector radar at each transmission cycle Tr, (b) is a diagram illustrating an orthogonal code OC (2) and a transmission code of a second sector radar at each transmission cycle Tr, and (c) is a diagram illustrating an orthogonal code OC (3) and a transmission code of a third sector radar at each transmission cycle Ti.

FIG. 7 and FIG. 8 are timing charts relating to operations of the wide area radar device of Modification Example 2 according to the first embodiment. FIG. 7($a$) and FIG. 8($a$) are diagrams illustrating an orthogonal code OC (1) and a transmission code of a first sector radar at each transmission cycle Tr. FIG. 7($b$) and FIG. 8($b$) are diagrams illustrating an orthogonal code OC (2) and a transmission code of a second sector radar at each transmission cycle Tr. FIG. 7($c$) and FIG. 8($c$) are diagrams illustrating an orthogonal code OC (3) and a transmission code of a third sector radar at each transmission cycle Tr.

Each sector radar receiver in each sector radar of the wide area radar device according to Modification Example 2 of the first embodiment periodically performs calculation using twelve transmission cycles (12Tr) as a signal processing section in each signal processor. In FIG. 7, transmission cycles up to the (M+7)-th transmission cycle that is the eighth transmission cycle Tr are shown in a case where the first transmission cycle Tr among the twelve transmission cycles (12Tr) that are the signal processing section is used as the M-th transmission cycle Tr. Similarly, in FIG. 8, transmission cycles up to the (M+11)-th transmission cycle Tr that is the twelfth transmission cycle Tr from the (M+8)-th transmission cycle Tr that is the ninth transmission cycle Tr are shown.

In the wide area radar device according to Modification Example 2 of the first embodiment, two arbitrary sector radars among three sector radars transmit the same high frequency transmission signal as that of the first embodiment, and the remaining one sector radar does not transmit the high frequency transmission signal. Further, the wide area radar device switches the sector radar that does not transmit the high frequency transmission signal in a time division manner every four transmission cycles (4Tr), among the twelve transmission cycles (12Tr).

Specifically, as shown in FIG. 7, in the wide area radar device, the first sector radar and the second sector radar transmit the same high frequency transmission signal as that of the first sector radar and the second sector radar according to the first embodiment, from the M-th transmission cycle Tr to the (M+3)-th transmission cycle Tr (see FIG. 2). On the other hand, the third sector radar does not transmit the high frequency transmission signal generated on the basis of any transmission signal among the transmission codes $a_n$, $b_n$, $-a_n$ and $-b_n$.

Similarly, as shown in FIG. 7, in the wide area radar device, the second sector radar and the third sector radar transmit the same high frequency transmission signal as that of the first sector radar and the second sector radar according to the first embodiment, from the (M+4)-th transmission cycle Tr to the (M+7)-th transmission cycle Tr. On the other hand, the first sector radar according to Modification Example 2 of the first embodiment does not transmit the high frequency transmission signal generated on the basis of any transmission signal among the transmission codes $a_n$, $b_n$, $-a_n$ and $-b_n$.

Similarly, as shown in FIG. 8, in the wide area radar device, the third sector radar and the first sector radar transmit the same high frequency transmission signal as that of the first sector radar and the second sector radar according to the first embodiment from the (M+8)-th transmission cycle Tr to the (M+11)-th transmission cycle Tr. On the other hand, the second sector radar according to Modification Example 2 of the first embodiment does not transmit the high frequency transmission signal generated on the basis of any transmission signal among the transmission codes $a_n$, $b_n$, $-a_n$ and $-b_n$.

As described above, the wide area radar device according to Modification Example 2 of the first embodiment assigns a non-signal section to a part of the sector radars and switches the sector radar that corresponds to the non-signal section every four transmission cycles among the twelve transmission cycles, to thereby obtain the same effect as that of the wide area radar device 1 according to the first embodiment.

Modification Example 3 of the First Embodiment

The wide area radar device according to Modification Example 2 of the first embodiment further includes the third sector radar and has thus the configuration of three sector radars, in a similar way to Modification Example 2 of the first embodiment. A wide area radar device according to Modification Example 3 of the first embodiment transmits a high frequency transmission signal of the orthogonal relationship between adjacent sector radars among three sector radars, in a similar way to the wide area radar device 1 of the first embodiment. A measurement area of a first sector radar is adjacent to a measurement area of a second sector radar. The measurement area of the second sector radar is adjacent to a measurement area of a third sector radar.

Figure 9:
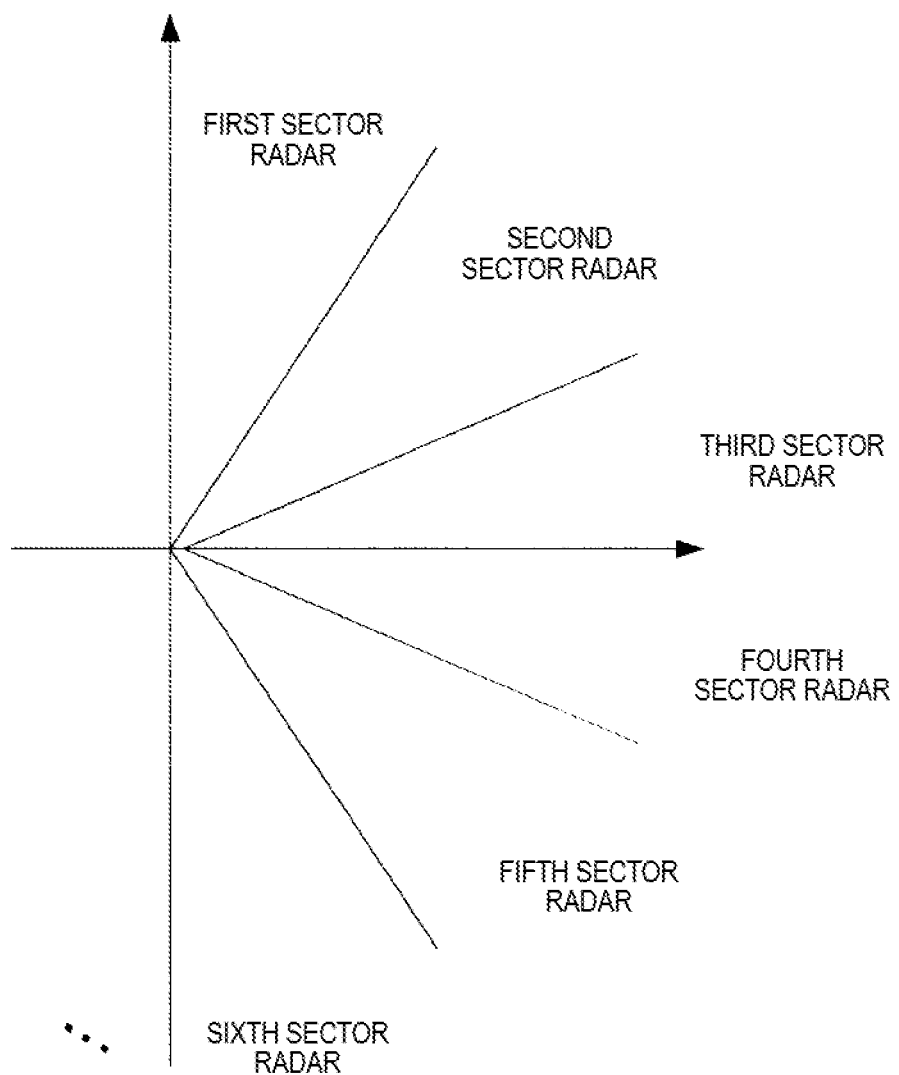
FIG. 9 is a diagram schematically illustrating a spatial arrangement in a wide range radar device that includes three or more plural sector radars.

FIG. 9 is a diagram schematically illustrating a spatial arrangement in a wide range radar device that is not limited to the wide area radar device according to Modification Example 3 of the first embodiment and includes three or more sector radars, for example. As shown in FIG. 9, in a case where the wide area radar device has a configuration of six sector radars, for example, a high frequency transmission signal of the orthogonal relationship is transmitted between adjacent sector radars, in a similar way to the wide area radar device 1 of the first embodiment.

For example, as shown in FIG. 9, between the first sector radar and the second sector radar that are adjacent to each other, a high frequency transmission signal of the orthogonal relationship is transmitted, in a similar way to the wide area radar device 1 of the first embodiment. That is, the first sector radar in FIG. 9 transmits the same high frequency transmission signal as that of the first sector radar of the wide area radar device 1 of the first embodiment. The second sector radar in FIG. 9 transmits the same high frequency transmission signal as that of the second sector radar of the wide area radar device 1 of the first embodiment.

Between the second sector radar and the third sector radar that are adjacent to each other, a high frequency transmission signal of the orthogonal relationship is transmitted, in a similar way to the wide area radar device 1 of the first embodiment. That is, the second sector radar in FIG. 9 transmits the same high frequency transmission signal as that of the second sector radar of the wide area radar device 1 of the first embodiment. The third sector radar in FIG. 9 transmits the same high frequency transmission signal as that of the first sector radar of the wide area radar device 1 of the first embodiment.

Between the third sector radar and a fourth sector radar that are adjacent to each other, a high frequency transmission signal of the orthogonal relationship is transmitted, in a similar way to the wide area radar device 1 of the first embodiment. That is, the third sector radar in FIG. 9 transmits the same high frequency transmission signal as that of the first sector radar of the wide area radar device 1 of the first embodiment. The fourth sector radar in FIG. 9 transmits the same high frequency transmission signal as that of the second sector radar of the wide area radar device 1 of the first embodiment.

Between the fourth sector radar and a fifth sector radar that are adjacent to each other, a high frequency transmission signal of the orthogonal relationship is transmitted, in a similar way to the wide area radar device 1 of the first embodiment. That is, the fourth sector radar in FIG. 9 transmits the same high frequency transmission signal as that of the second sector radar of the wide area radar device 1 of the first embodiment. The fifth sector radar in FIG. 9 transmits the same high frequency transmission signal as that of the first sector radar of the wide area radar device 1 of the first embodiment.

Between the fifth sector radar and a sixth sector radar that are adjacent to each other, a high frequency transmission signal of the orthogonal relationship is transmitted, in a similar way to the wide area radar device 1 of the first embodiment. That is, the fifth sector radar in FIG. 9 transmits the same high frequency transmission signal as that of the first sector radar of the wide area radar device 1 of the first embodiment. The sixth sector radar in FIG. 9 transmits the same high frequency transmission signal as that of the second sector radar of the wide area radar device 1 of the first embodiment.

Figure 10:
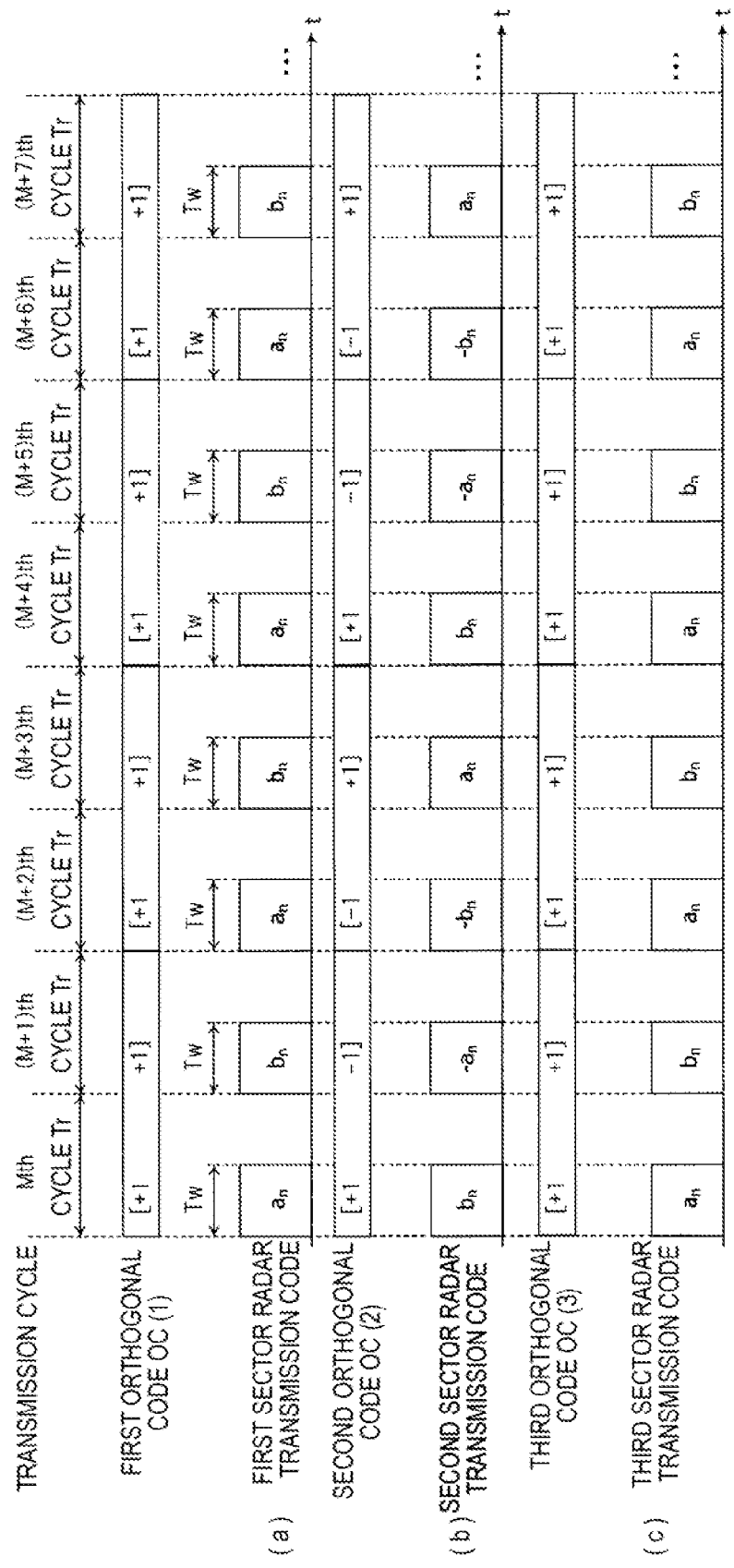
FIG. 10 is a timing chart relating to a part of another operation of a wide range radar device that includes three sector radars, in which (a) is a diagram illustrating an orthogonal code OC (1) and a transmission code of a first sector radar at each transmission cycle Tr, (b) is a diagram illustrating an orthogonal code OC (2) and a transmission code of a second sector radar at each transmission cycle Tr, and (c) is a diagram illustrating an orthogonal code OC (3) and a transmission code of a third sector radar at each transmission cycle Tr.
Figure 11:
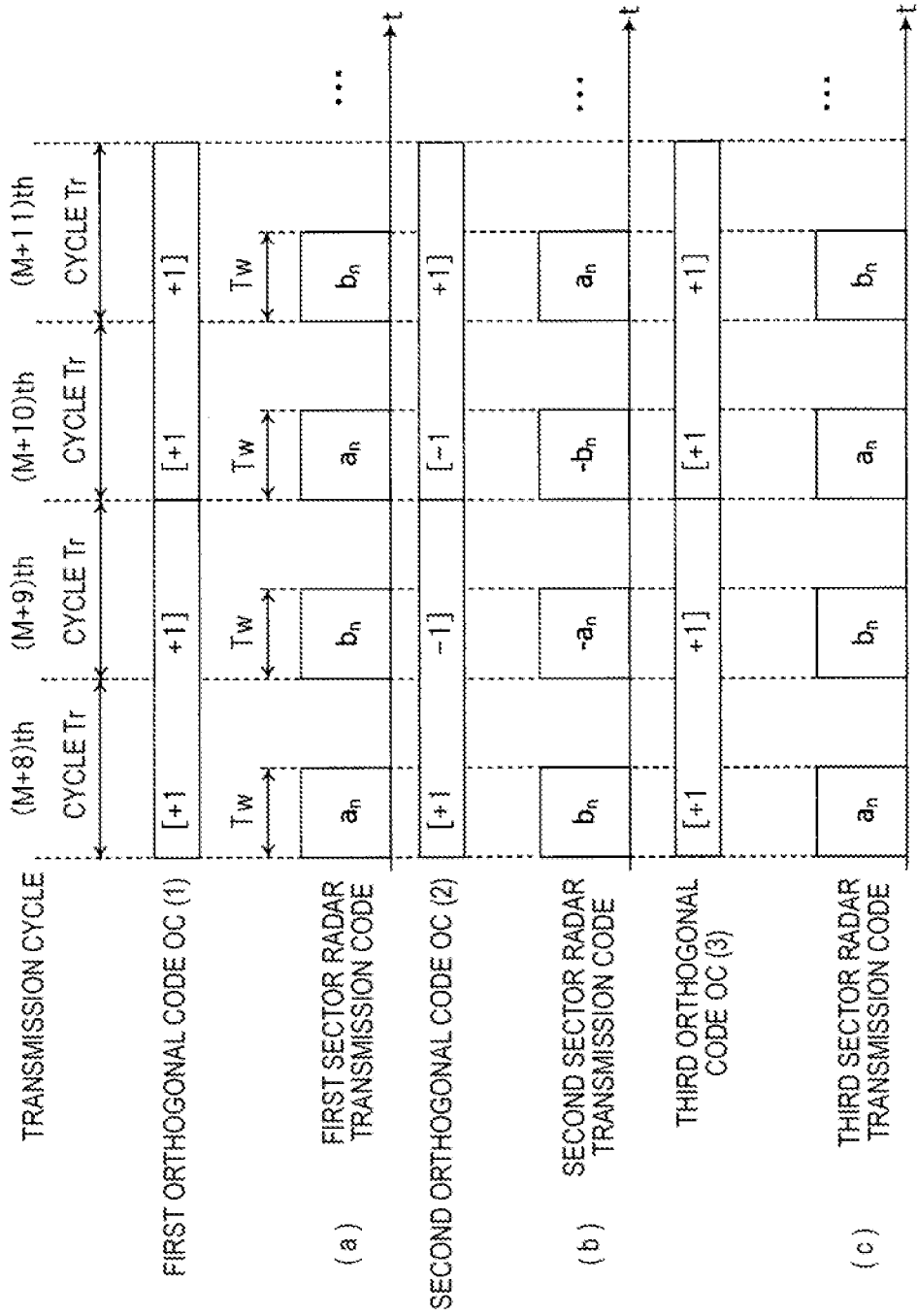
FIG. 11 is a timing chart relating to a part of another operation of a wide range radar device that includes three sector radars, in which (a) is a diagram illustrating an orthogonal code OC (1) and a transmission code of a first sector radar at each transmission cycle Tr, (b) is a diagram illustrating an orthogonal code OC (2) and a transmission code of a second sector radar at each transmission cycle Tr, and (c) is a diagram illustrating an orthogonal code OC (3) and a transmission code of a third sector radar at each transmission cycle Tr.
Figure 14:
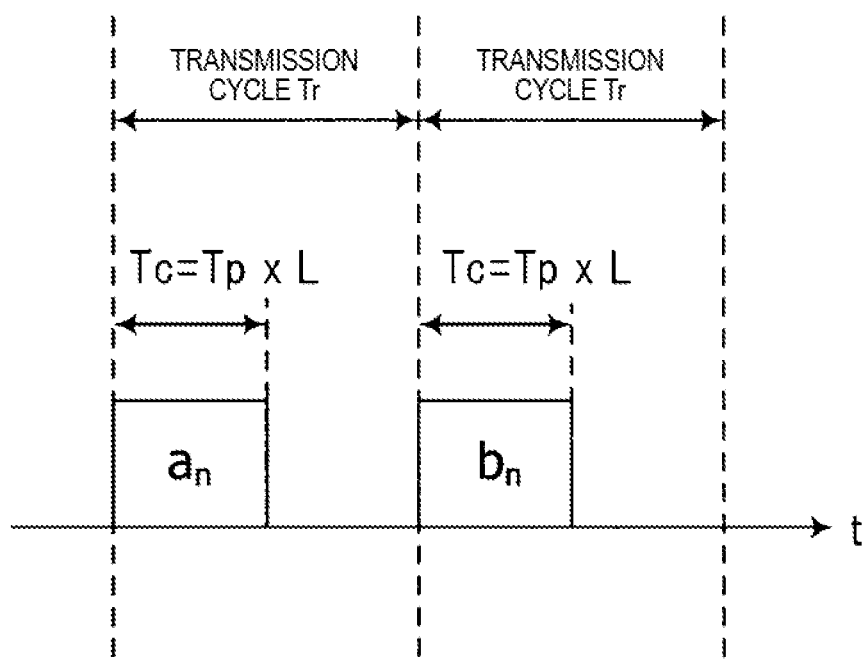
FIG. 14 is a diagram illustrating a transmission cycle and a transmission code used for each transmission cycle in pulse compression radar in the related art.

FIG. 10 and FIG. 11 are timing charts relating to a part of another operation of the wide range radar device according to Modification Example 3 of the first embodiment. FIG. 10(a) to FIG. 10(a) are diagrams illustrating an orthogonal code OC (1) and a transmission code of a first sector radar at each transmission cycle Tr, FIG. 10(b) and FIG. 11(b) are diagrams illustrating an orthogonal code OC (2) and a transmission code of a second sector radar at each transmission cycle Tr, and FIG. 10(c) and FIG. 11(c) are diagrams illustrating an orthogonal code OC (3) and a transmission code of a third sector radar at each transmission cycle Tr.

Each sector radar receiver in each sector radar of the wide area radar device according to Modification Example 3 of the first embodiment periodically performs calculation using four transmission cycles (4Tr) as a signal processing section in each signal processor. In FIG. 10, transmission cycles up to the (M+7)-th transmission cycle that is the eighth transmission cycle Tr are shown in a case where the first transmission cycle Tr among the twelve transmission cycles (12Tr) that are the signal processing section is used as the M-th transmission cycle Tr. Similarly, in FIG. 11, transmission cycles up to the (M+11)-th transmission cycle Tr that is the twelfth transmission cycle Tr from the (M+8)-th transmission cycle Tr that is the ninth transmission cycle Tr are shown.

As described above, in the wide area radar device according to Modification Example 3 of the first embodiment, among three sector radars, each measurement area of the first sector radar and the third sector radar is adjacent to the measurement area of the second sector radar. That is, the first sector radar is provided to be adjacent to the second sector radar, and the second sector radar is provided to be adjacent to the third sector radar.

As shown in FIG. 10 and FIG. 11, in the wide area radar device according to Modification Example 3 of the first embodiment, the first sector radar and the third sector radar transmit the same high frequency transmission signal as that of the first sector radar of the first embodiment, from the M-th transmission cycle Tr to the (M+3)-th transmission cycle Tr. Further, the second sector radar transmits the same high frequency transmission signal as that of the second sector radar of the first embodiment.

As shown in FIG. 10 and FIG. 11, in the wide area radar device according to Modification Example 3 of the first embodiment, the first sector radar and the third sector radar transmit the same high frequency transmission signal as that of the first sector radar of the first embodiment, from the (M+4)-th transmission cycle Tr to the (M+7)-th transmission cycle Tr. Further, the second sector radar transmits the same high frequency transmission signal as that of the second sector radar of the first embodiment.

As shown in FIG. 10 and FIG. 11, in the wide area radar device according to Modification Example 3 of the first embodiment, the first sector radar and the third sector radar transmit the same high frequency transmission signal as that of the first sector radar of the first embodiment, from the (M+8)-th transmission cycle Tr to the (M+11)-th transmission cycle Tr. Further, the second sector radar transmits the same high frequency transmission signal as that of the second sector radar of the first embodiment.

As described above, the wide area radar device according to Modification Example 3 of the first embodiment transmits the high frequency transmission signal of the orthogonal relationship between the adjacent sector radars in the unit of four transmission cycles, and thus, it is possible to obtain the same effect as that of the wide area radar device 1 of the first embodiment.

The above description is as follows. First, the transmission format of the first sector radar according to the first embodiment is used for the odd sector. On the other hand, the transmission format of the second sector radar according to the first embodiment is used for the even sector. Thus, the transmission format used in two sector radars in the first embodiment is repeatedly used in the sector radars that are spatially separated, and thus, it is possible to reduce interference between sectors even in the case of three or more sectors.

Here, contrarily to the above description, in a case where the transmission format of the second sector radar according to the first embodiment is used for the odd sector and the transmission format of the first sector radar according to the first embodiment is used for the even sector, it is similarly possible to reduce interference between sectors even in the case of three or more sectors, even in a case where the transmission format used in two sector radars in the first embodiment is repeatedly used in the spatially separated sector.

Modification Example 4 of the First Embodiment

In the above-described first embodiment, the first sub separation code subOC (1) is generated using the characteristic obtained as the complementary codes $a_n$ and $b_n$ having the code length L are connected with $c_n$ and $d_n$ that form the pair of complementary codes having the code length L/2 as shown in Formula (18).

In Modification Example 4 according to the first embodiment, the u-th sub separation code subOC (u) is generated using a characteristic obtained as the complementary codes $a_n$ and $b_n$ having a code length L are connected with $c_n$ and $d_n$ that form a pair of complementary codes having a code length L/2 as shown in Formula (29) (see NPL 1). The $c_n$ and $d_n$ that form the pair of complementary codes having the code length L/2 are expressed as shown in Formula (19). Further, a parameter $W_{n-1}$ satisfies Formula (30) by an arbitrary complex coefficient.

[Exp. 29]

$$a_n = [a_1, a_2, \ldots, a_{L/2}, a_{(L/2)+1}, \ldots, a_L] \quad (29)$$
$$= [c_1, c_2, \ldots, c_{L/2}, W_{n-1}d_1, W_{n-1}d_2, \ldots, W_{n-1}d_{L/2}]$$
$$b_n = [b_1, b_2, \ldots, b_{L/2}, b_{(L/2)+1}, \ldots, b_L]$$
$$= [c_1, c_2, \ldots, c_{L/2}, -W_{n-1}d_1, -W_{n-1}d_2, \ldots, -W_{n-1}d_{L/2}]$$

[Exp. 30]

$$|W_{n-1}| = 1 \quad (30)$$

A method of generating a first sub separation code according to Modification Example 4 of the first embodiment will be specifically described using the relationships shown in Formulas (19) and (29). As shown in FIG. 2(a), when the high frequency transmission signal is transmitted at each transmission cycle Tr from the M-th order to the (M+3)-th order, an orthogonal code OC (M, 1) is multiplied by the transmission code $a_n$ or the transmission code $b_n$. That is, the transmission codes $[a_n, b_n, a_n, b_n]$ corresponding to each transmission cycle Tr from the M-th order to the (M+3)-th order is multiplied by an orthogonal code OC(u)=[1, 1, 1, 1].

In a case where the transmission codes $[a_n, b_n, a_n, b_n]$ of the multiplication result are replaced by sub-codes $c_n$ and $d_n$ having the code length L/2, the result becomes $[c_n, W_{n-1}d_n, c_n, -W_{n-1}d_n, c_n, W_{n-1}d_n]$.

A u-th sub separation code generator of the wide area radar device according to Modification Example 4 of the first embodiment generates coefficients of the respective transmission codes in a case where the transmission codes $[a_n, b_n, a_n, b_n]$ are replaced by the sub codes $c_n$ and $d_n$ having the code length L/2, as the u-th sub separation code subOC (u). That is, the u-th sub separation code generator generates the coefficients $[1, W_{n-1}, 1, -W_{n-1}, 1, W_{n-1}, 1, -W_{n-1}]$ as the u-th sub separation code subOC (U).

Further, in a similar way to the u-th sub separation code generator of the u-th sector radar in the (u+1)-th sector radar, a (u+1)-th sub separation code generator generates a (u+1)-th sub separation code subOC (u+1). Specifically, as shown in FIG. 2(b), when the high frequency transmission signal is transmitted at each transmission cycle Tr from the M-th order to the (M+3)-th order, using the relationships shown in Formula (19) and Formula (29), an orthogonal code OC (M, 2) is multiplied by the transmission code $a_n$ or the transmission code $b_n$. That is, the transmission codes $[b_n, a_n, b_n, a_n]$ corresponding to each transmission cycle Tr from the M-th order to the (M+3)-th order is multiplied by an orthogonal code OC (u+1)=[1, −1, −1, 1].

In a case where the transmission codes $[b_n, -a_n, -b_n, a_n]$ of the multiplication result are replaced by the sub-codes $c_n$ and $d_n$ having the code length L/2, the result becomes $[c_n, -W_{n-1}d_n, -c_n, -W_{n-1}d_n, -c_n, W_{n-1}d_n, c_n, W_{n-1}d_n]$. The (u+1)-th sub separation code generator generates coefficients of the respective transmission codes in a case where the transmission codes $[b_n, a_n, b_n, a_n]$ are replaced by the sub codes $c_n$ and $d_n$ having the code length L/2, as the (u+1)-th sub separation code subOC (u+1).

That is, the (u+1)-th sub separation code generator generates the coefficients $[1, -W_{n-1}, -1, -W_{n-1}, -1, W_{n-1}, 1, W_{n-1}]$ as the (u+1)-th sub separation code subOC (u+1). In the following description, an h-th element of the u-th sub separation code subOC (u) is expressed as subOC (h, u). Here, a parameter h is 1, 2, . . . , 8.

As described above, between the respective sector radars, the u-th sub separation code subOC (u)=$[1, W_{n-1}, 1, -W_{n-1}, 1, W_{n-1}, 1, -W_{n-1}]$ and the (u+1)-th sub separation code subOC (u+1)=$[1, -W_{n-1}, -1, -W_{n-1}, -1, W_{n-1}, 1, -W_{n-1}]$, the relationship shown in Formula (31) is established.

That is, the u-th sub separation code subOC (u) and the (u+1)-th sub separation code subOC (u+1) are orthogonal to each other in the unit of two elements of the respective sub separation codes (corresponding to one transmission cycle (1Tr)), in the unit of four elements thereof (corresponding to two transmission cycle (2Tr)), and in the unit of eight elements thereof (corresponding to four transmission cycles (4Tr)).

Through the relationship shown in Formula (31), in a case where it is considered that fluctuation of the reception signals is static over one transmission cycle (Tr), the two transmission cycles (2Tr) and the four transmission cycles (4Tr), the wide area radar device according to Modification Example 4 of the first embodiment may suppress the interference signal component from the other sector radar.

[Exp. 31]

$$\sum_{h=2(i-1)+1}^{2i} subOC(h, u)subOC(h+1, u+1) = 0 (i = 1, 2, 3, 4) \quad (31)$$

$$\sum_{h=4(i-1)+1}^{4i} subOC(h, u)subOC(h+1, u+1) = 0 (i = 1, 2)$$

$$\sum_{h=1}^{8} subOC(h, u)subOC(h+1, u+1) = 0$$

Hereinbefore, various examples have been described with reference to the accompanying drawings, but the radar device of the invention is not limited to the examples. It is obvious to those skilled in the art that various modification examples or revision examples may be made in the range disclosed in claims, and these modification examples or revision examples are included in the technical scope of the invention.

In the above-described embodiments, the A/D converters 22 and 23 convert the baseband in-phase signal and orthogonal signal output from the quadrature detector 20 of the RF receiver 17 into digital data by oversampling based on the discrete time k. However, the A/D converters 22 and 23 may not perform A/D conversion at the same sampling rate as in the baseband transmission signal in the radar transmitter 2.

For example, in the radar transmitter according to each embodiment, the baseband transmission signal is generated using a sampling number $N_r$ with respect to the code length L. This corresponds to the oversampling of $N_r$/L samples per code. However, in the radar receiver according to each embodiment, it is possible to perform signal processing of the reception signal even in the case of one or more multiples of samples per code.

In the above-described first embodiment, the first sector radar transmits the high frequency transmission signal using the transmission code shown in FIG. 2(a) in the unit of four transmission cycles (4Tr). Further, the second sector radar transmits the high frequency transmission signal using the transmission code shown in FIG. 2(b) in the unit of four transmission cycles (4Tr).

However, the transmission code that is the source of the high frequency transmission signal transmitted in each sector radar may be switched every four transmission cycles (4Tr). For example, the transmission codes $a_n$ and $b_n$ may be reversely switched.

In the above-described first embodiment, the orthogonal code OC (1)=[1, 1, 1, 1] and the orthogonal code OC (2)=[1, -1, -1, 1] having the code length P=4 are used. However, the orthogonal code OC (1) and the orthogonal code OC (2) are not limited thereto. For example, as an example of other orthogonal code OC (1) and orthogonal code OC (2), an orthogonal code OC (1)=[1, -1, 1, -1] and an orthogonal code OC (2)=[1, 1, -, -1], an orthogonal code OC (1)=[1, 1, -1, -1] and an orthogonal code OC (2)=[1, -1, 1, -1], an orthogonal code OC (1)=[1, -1, 1, -1] and an orthogonal code OC (2)=[-1, 1, 1, -1], or an orthogonal code OC (1)=[1, -1, -1, 1] and an orthogonal code OC (2)=[-1, 1, -1, 1] may be used.

That is, it is sufficient if the orthogonal code OC (1) and the orthogonal code OC (2) have the orthogonal relationship and the high frequency transmission signal transmitted from the first sector radar or the second sector radar is separable.

The disclosure of Japanese Patent Application No. 2010-227994, filed on Oct. 7, 2010 is incorporated herein by reference in its entirety.

INDUSTRIAL APPLICABILITY

The invention is useful for a radar device that maintains low range sidelobe characteristics in a signal of a reflected wave from a target and reduces interference between a plurality of sector radars even in a case where the target moves.

REFERENCE SIGNS LIST

1 WIDE RANGE RADAR DEVICE
2 FIRST SECTOR RADAR TRANSMITTER
2a SECOND SECTOR RADAR TRANSMITTER
3 FIRST SECTOR RADAR RECEIVER
3a SECOND SECTOR RADAR RECEIVER
4 TRANSMISSION SIGNAL GENERATOR
5 FIRST CODE GENERATOR
6 SECOND CODE GENERATOR
7 TRANSMISSION CODE SWITCH
8 ORTHOGONAL CODE GENERATOR
9 ORTHOGONAL CODE MULTIPLIER
10 MODULATOR
11 LPF
12 RF TRANSMITTER
13, 17 FREQUENCY CONVERTER
14, 16 AMPLIFIER
15 RF RECEIVER
18 QUADRATURE DETECTOR
19 SIGNAL PROCESSOR
20, 21 A/D CONVERTER
22 FIRST SEPARATION CODE GENERATOR
23 FIRST CORRELATION VALUE CALCULATOR
24 FIRST SUB SEPARATION CODE GENERATOR
25 SECOND CORRELATION VALUE CALCULATOR
26 FIRST SEPARATION CODE MULTIPLIER
27 FIRST ADDITION PROCESSOR
28 SECOND ADDITION PROCESSOR

29 MATCH DETERMINER
30 INCOMING DISTANCE ESTIMATOR
ANTs1 FIRST TRANSMISSION ANTENNA
RNTs2 SECOND TRANSMISSION ANTENNA
ANTr1 FIRST RECEPTION ANTENNA
RNTr2 SECOND RECEPTION ANTENNA
CM TRANSMISSION CODE STORAGE
CT1, CT2 TRANSMISSION CODE CONTROLLER
Lo REFERENCE SIGNAL OSCILLATOR
Tr TRANSMISSION CYCLE
Tw TRANSMISSION SECTION

The invention claimed is:

1. A radar device comprising:
a first code generator which, in operation, generates a first code sequence having a defined code length and a second code sequence having the defined code length;
a first multiplier which, in operation, multiplies the first code sequence for transmission in a first transmission cycle and the second code sequence for transmission in a second transmission cycle, respectively, by a first orthogonal coefficient sequence,
a first transmission signal generator which, in operation, generates a first transmission signal by modulating the first code sequence multiplied by the first orthogonal coefficient sequence and generates a second transmission signal by modulating the second code sequence multiplied by the first orthogonal coefficient sequence;
a first RF transmitter which, in operation, converts the first transmission signal into a first radio frequency transmission signal and transmits the first radio frequency transmission signal through a first transmission antenna in the first transmission cycle, and converts the second transmission signal into a second radio frequency transmission signal and transmits the second radio frequency transmission signal through the first transmission antenna in the second transmission cycle;
a second multiplier which, in operation, multiplies the second code sequence for transmission in the first transmission cycle and the first code sequence for transmission in the second transmission cycle, respectively, by a second orthogonal coefficient sequence, which is orthogonal to the first orthogonal coefficient sequence;
a second transmission signal generator which, in operation, generates a third transmission signal by modulating the second code sequence multiplied by the second orthogonal coefficient sequence and generates a fourth transmission signal by modulating the first code sequence multiplied by the second orthogonal coefficient sequence; and
a second RF transmitter which, in operation, converts the third transmission signal into a third radio frequency transmission signal and transmits the third radio frequency transmission signal through a second transmission antenna in the first transmission cycle, and converts the fourth transmission signal into a fourth radio frequency transmission signal and transmits the fourth radio frequency transmission signal through the second transmission antenna in the second transmission cycle,
wherein at least one of the first and second orthogonal coefficient sequences includes one or more negative coefficients, and the first and second orthogonal coefficient sequences respectively include coefficients, which are identical to each other, in one of the first and second transmission cycles, and include coefficients, which are different from each other, in the other of the first and second transmission cycles.

2. The radar device according to claim 1, wherein the first code sequence and the second code sequence are code sequences which form a pair of complementary codes.

3. The radar device according to claim 1,
wherein the first multiplier further multiplies the first code sequence for transmission in a third transmission cycle and the second code sequence for transmission in a fourth transmission cycle, respectively, by a third orthogonal coefficient sequence;
wherein the first transmission signal generator further generates a fifth transmission signal by modulating the first code sequence multiplied by the third orthogonal coefficient sequence and generates a sixth transmission signal by modulating the second code sequence multiplied by the third orthogonal coefficient sequence;
wherein the first RF transmitter further converts the fifth transmission signal into a fifth radio frequency transmission signal and transmits the fifth radio frequency transmission signal through the first transmission antenna in a third transmission cycle, and converts the sixth transmission signal into a sixth radio frequency transmission signal and transmits the sixth radio frequency transmission signal through the first transmission antenna in a fourth transmission cycle;
wherein the second multiplier further multiplies the second code sequence for transmission in the third transmission cycle and the first code sequence for transmission in the fourth transmission cycle, respectively, by a fourth orthogonal coefficient sequence, which is orthogonal to the third orthogonal coefficient sequence;
wherein the second transmission signal generator further generates a seventh transmission signal by modulating the second code sequence multiplied by the fourth orthogonal coefficient sequence and generates an eighth transmission signal by modulating the first code sequence multiplied by the fourth orthogonal coefficient sequence;
wherein the second RF transmitter further converts the seventh transmission signal into a seventh radio frequency transmission signal and transmits the seventh radio frequency transmission signal through the second transmission antenna in the third transmission cycle, and converts the eighth transmission signal into an eighth radio frequency transmission signal and transmits the result eighth radio frequency transmission signal through the second transmission antenna in the fourth transmission cycle; and
wherein at least one of the third and fourth orthogonal coefficient sequences includes one or more negative coefficients, and the third and fourth orthogonal coefficient sequences respectively include coefficients, which are identical to each other, in one of the third and fourth transmission cycles, and include coefficients, which are different from each other, in the other of the third and fourth transmission cycles.

4. The radar device according to claim 1, further comprising:
a first RF receiver which, in operation, converts a signal of a reflected wave obtained when the first and second radio frequency transmission signals transmitted from the first RF transmitter and the third and fourth radio frequency transmission signals transmitted from the second RF transmitter are reflected by a target into a baseband reception signal;
a first correlation value calculator which, in operation, calculates a first correlation value between the reception signal converted by the first RF receiver and a signal corresponding to one of the first and second transmission signals generated by the first transmission signal generator;
a first orthogonal code multiplier which, in operation, multiplies the first orthogonal coefficient sequence by the first correlation value;
a first addition processor which, in operation, adds the multiplication results of the first orthogonal code multiplier over the first and second transmission cycles;
a first sub separation code generator which, in operation, generates a first sub separation code capable of separating the first and second radio frequency transmission signals transmitted from the first transmission antenna by sub codes obtained by dividing the first and second code sequences by a predetermined number;
a second correlation value calculator which, in operation, performs calculation at each first half section and each second half section of each transmission cycle and multiplies a correlation value in the first half section and a correlation value in the second half section by the first sub separation code to calculate a second correlation value, according to the reception signal converted by the first RF receiver and the signal corresponding to one of the first and second transmission signals generated by the first transmission signal generator;
a second addition processor which, in operation, adds the calculation results of the second correlation value calculator over the first and second transmission cycles; and
a first match determiner which, in operation, outputs a first average correlation value at a first discrete time when (i) the first average correlation value added by the first addition processor exceeds a first threshold value at the first discrete time, and (ii) a second average correlation value added by the second addition processor exceeds a second threshold value different from the first threshold value at the first discrete time.

5. The radar device according to claim 4, further comprising:
a second RF receiver which, in operation, converts a signal of a reflected wave obtained when the first and second radio frequency transmission signals transmitted from the first RF transmitter and the third and fourth radio frequency transmission signals transmitted from the second RF transmitter are reflected by the target into a baseband reception signal;
a third correlation value calculator which, in operation, calculates a third correlation value between the reception signal converted by the second RF receiver and a signal corresponding to one of the third and fourth transmission signals generated by the second transmission signal generator;
a second orthogonal code multiplier which, in operation, multiplies the second orthogonal coefficient sequence by the third correlation value;
a third addition processor which, in operation, adds the multiplication results of the second orthogonal code multiplier over the first and second transmission cycles;
a second sub separation code generator which, in operation, generates a second sub separation code capable of separating the third and fourth radio frequency transmission signals transmitted from the second transmission antenna by sub codes obtained by dividing the first and second code sequences by a predetermined number;
a fourth correlation value calculator which, in operation, performs calculation at each first half section and each second half section of each transmission cycle and multiplies a correlation value in the first half section and a correlation value in the second half section by the second sub separation code to calculate a fourth correlation value, according to the reception signal converted by the second RF receiver and the signal corresponding to the third and fourth transmission signals generated by the second transmission signal generator;
a fourth addition processor which, in operation, adds the calculation results of the fourth correlation value calculator over the first and second transmission cycles; and
a second match determiner which, in operation, outputs a third average correlation value at a third discrete time when (i) the third average correlation value added by the third addition processor exceeds a third threshold value at the third discrete time, and (ii) a fourth average correlation value added by the fourth addition processor exceeds a fourth threshold value different from the third threshold value at the third discrete time.

6. The radar device according to claim 5, further comprising:
an incoming distance estimator which, in operation, calculates an incoming distance of the target according to the first average correlation value or the third average correlation value output from the first match determiner or the second match determiner.

7. The radar device according to claim 5, further comprising:
an incoming distance estimator which, in operation, calculates an incoming distance of the target according to the first average correlation value and the third average correlation value output from the first match determiner and the second match determiner, respectively.

8. The radar device according to claim 5, further comprising:
an A/D converter which, in operation, converts the reception signals which are respectively converted by the first RF receiver and the second RF receiver into digital data.

9. The radar device according to claim 8, further comprising:
a first separation code generator which, in operation, outputs the first orthogonal coefficient sequence in synchronization in the first and second transmission cycles; and
a second separation code generator which, in operation, outputs the second orthogonal coefficient sequence in synchronization in the first and second transmission cycles.

10. The radar device according to claim 1, further comprising:
a third multiplier which, in operation, multiplies the second code sequence for transmission in a fifth transmission cycle and the first code sequence for transmission in a sixth transmission cycle, respectively, by a fifth orthogonal coefficient sequence;
a third transmission signal generator which, in operation, generates an eleventh transmission signal by modulating the second code sequence multiplied by the fifth orthogonal coefficient sequence and generates a twelfth transmission signal by modulating the first code sequence multiplied by the fifth orthogonal coefficient sequence; and
a third RF transmitter which, in operation, converts the eleventh transmission signal into an eleventh radio frequency transmission signal and transmits the eleventh radio frequency transmission signal through a third transmission antenna in a fifth transmission cycle, and converts the twelfth transmission signal into a twelfth radio frequency transmission signal and transmits the twelfth radio frequency transmission signal through the third transmission antenna in a sixth transmission cycle, wherein the second multiplier further multiplies the first code sequence for transmission in the fifth transmission cycle and the second code sequence for transmission in the sixth transmission cycle, respectively, by a sixth orthogonal coefficient sequence, which is orthogonal to the fifth orthogonal coefficient sequence;

wherein the second transmission signal generator further generates a ninth transmission signal by modulating the first code sequence multiplied by the sixth orthogonal coefficient sequence and generates a tenth transmission signal by modulating the second code sequence multiplied by the sixth orthogonal coefficient sequence;

wherein the second RF transmitter converts the ninth transmission signal into a high ninth radio frequency transmission signal and transmits the ninth radio frequency transmission signal through the second transmission antenna in the fifth transmission cycle, and converts the tenth transmission signal into a tenth radio frequency transmission signal and transmits the tenth radio frequency transmission signal through the second transmission antenna in the sixth transmission cycle; and wherein at least one of the fifth and sixth orthogonal coefficient sequences includes one or more negative coefficients, and the fifth and sixth orthogonal coefficient sequences respectively include coefficients, which are identical to each other, in one of the fifth and sixth transmission cycles, and include coefficients, which are different from each other, in the other of the fifth and sixth transmission cycles.

11. The radar device according to claim 10, wherein the third multiplier further multiplies the second code sequence for transmission in a seventh transmission cycle and the first code sequence for transmission in an eighth transmission cycle, respectively, by a seventh orthogonal coefficient sequence;

wherein the third transmission signal generator further generates a fifteenth transmission signal by modulating the second code sequence multiplied by the seventh orthogonal coefficient sequence and generates a sixteenth transmission signal by modulating the first code sequence multiplied by the seventh orthogonal coefficient sequence;

wherein the third RF transmitter further converts the fifteenth transmission signal into a fifteenth radio frequency transmission signal and transmits the fifteenth radio frequency transmission signal through the third transmission antenna in the seventh transmission cycle, and converts the sixteenth transmission signal into a sixteenth radio frequency transmission signal and transmits the sixteenth radio frequency transmission signal through the third transmission antenna in the eighth transmission cycle, wherein the second multiplier further multiplies the first code sequence for transmission in the seventh transmission cycle and the second code sequence for transmission in the eighth transmission cycle, respectively, by an eighth orthogonal coefficient sequence, which is orthogonal to the seventh orthogonal coefficient sequence;

wherein the second transmission signal generator further generates a thirteenth transmission signal by modulating the first code sequence multiplied by the eighth orthogonal coefficient sequence and generates a fourteenth transmission signal by modulating the second code sequence multiplied by the eighth orthogonal coefficient sequence;

wherein the second RF transmitter further converts the thirteenth transmission signal into a thirteenth radio frequency transmission signal and transmits the thirteenth radio frequency transmission signal through the second transmission antenna in the seventh transmission cycle, and converts the fourteenth transmission signal into a fourteenth radio frequency transmission signal and transmits the fourteenth radio frequency transmission signal through the second transmission antenna in the eighth transmission cycle; and wherein at least one of the seventh and eighth orthogonal coefficient sequences includes one or more negative coefficients, and the seventh and eighth orthogonal coefficient sequences respectively include coefficients, which are identical to each other, in one of the seventh and eighth transmission cycles, and include coefficients, which are different from each other, in the other of the seventh and eighth transmission cycles.

12. The radar device according to claim 1, further comprising:

a third multiplier which, in operation, multiplies the first code sequence for transmission in the first transmission cycle and the second code sequence for transmission in the second transmission cycle, respectively, by a ninth orthogonal coefficient sequence;

a third transmission signal generator which, in operation, generates a seventeenth transmission signal by modulating the first code sequence multiplied by the first orthogonal coefficient sequence and generates an eighteenth transmission signal by modulating the second code sequence multiplied by the ninth orthogonal coefficient sequence; and a third RF transmitter which, in operation, converts the seventeenth transmission signal into a seventeenth radio frequency transmission signal and transmits the seventeenth radio frequency transmission signal through a third transmission antenna in the first transmission cycle, and converts the eighteenth transmission signal into an eighteenth radio frequency transmission signal and transmits the eighteenth radio frequency transmission signal through the third transmission antenna in the second transmission cycle.

13. The radar device according to claim 12, wherein the third multiplier further multiplies the first code sequence for transmission in a third transmission cycle and the second code sequence for transmission in a fourth transmission cycle, respectively, by a tenth orthogonal coefficient sequence;

wherein the third transmission signal generator further generates a nineteenth transmission signal by modulating the first code sequence multiplied by the tenth orthogonal coefficient sequence and generates a twentieth transmission signal by modulating the second code sequence multiplied by the tenth orthogonal coefficient sequence; and wherein the third RF transmitter further converts the nineteenth transmission signal into a nineteenth radio frequency transmission signal and transmits the nineteenth radio frequency transmission signal through the third transmission antenna in the third transmission cycle, and converts the twentieth transmission signal into a twentieth radio frequency transmission signal and transmits the twentieth radio frequency transmission signal through the third transmission antenna in the fourth transmission cycle.

14. The radar device according to claim 12, further comprising:
    an A/D converter which, in operation, converts the reception signals which are respectively converted by the first RF receiver, the second RF receiver and the third RF receiver into digital data.

15. The radar device according to claim 14, further comprising:
    a first separation code generator which, in operation, outputs the first orthogonal coefficient sequence in synchronization in the first and second transmission cycles;
    a second separation code generator which, in operation, outputs the second orthogonal coefficient sequence in synchronization in the first and second transmission cycles; and
    a third separation code generation which, in operation, outputs the ninth orthogonal coefficient sequence in synchronization in the first and second transmission cycles.

* * * * *